United States Patent [19]
Acton et al.

[11] Patent Number: 6,134,647
[45] Date of Patent: *Oct. 17, 2000

[54] COMPUTING SYSTEM HAVING MULTIPLE NODES COUPLED IN SERIES IN A CLOSED LOOP

[75] Inventors: John D. Acton, Plantation; Michael D. Derbish; Gavin G. Gibson, both of Coral Springs; Jack M. Hardy, Jr., Sunrise; Hugh M. Humphreys, Coral Springs; Steven P. Kent, Sunrise; Steven E. Schelong, Plantation; Ricardo Yong, North Miami Beach; William B. DeRolf, Plantation, all of Fla.

[73] Assignee: Sun Microsystems, Inc., Palo Alto, Calif.

[*] Notice: This patent is subject to a terminal disclaimer.

[21] Appl. No.: 09/290,879

[22] Filed: Apr. 14, 1999

Related U.S. Application Data

[63] Continuation of application No. 08/826,805, Mar. 25, 1997.

[51] Int. Cl.[7] .................................................... G06F 15/00
[52] U.S. Cl. ................................ 712/28; 712/23; 712/11
[58] Field of Search .................................. 712/28, 23, 1, 712/11; 709/201

[56] References Cited

U.S. PATENT DOCUMENTS

| 4,633,394 | 12/1986 | Georgiou et al. | 710/240 |
| 5,327,570 | 7/1994 | Foster et al. | 712/30 |
| 5,710,932 | 1/1998 | Hamanaka et al. | 712/14 |

OTHER PUBLICATIONS

"Continuous econfiguration in a Multi–Microprocessor Flight Control System", Lt. S. L. Maher/Capt. S. J. Larimer, AGARD Conference Proceedings No. 303 –"Tactical Airborne Distributed Computing and Networks" Roros, Norway 22–25 Jun. 1981.

"A Solution to Bus Contention in a System of Autotonomous Microprocessors"Capt. S. J.Larimer/Lt. S. L. Maher –Air Force Wright Aeronautical Laboratories, Proc. IEEE, 1981, May, pp. 309–317.

"An Architecture for Event–Driven Real–Time Distributed Computer System" James E. McDonald (AFWAL/AAAF)–pp. 688–694.

*Primary Examiner*—Meng-Ai T. An
*Assistant Examiner*—Mackly Monestime
*Attorney, Agent, or Firm*—Conley, Rose & Tayon, PC; B. Noel Kivlin

[57] ABSTRACT

A data processing system includes a plurality of nodes, a serial data bus interconnecting the nodes in series in a closed loop for passing address and data information, and at least one processing node. In one construction, this processing node has a processor, a printed circuit board, a memory partitioned into first and second sections and a local bus connecting the processor, a block sharable memory section of the memory, and the printed circuit board. The local bus is used for transferring data in parallel from the processor to a directly sharable memory section of the memory on the printed circuit board and for transferring data from the block sharable memory to the printed circuit board. The printed circuit board includes a sensor for sensing when data is transferred into the directly sharable memory, a queuing device for queuing the sensed data, a serializer for serializing the queued data, a transmitter for transmitting the serialized data onto the serial data bus to the next successive processing node, a receiver for receiving serialized data from next preceding processing node, and a deserializer for deserializing the received serialized data into parallel data.

22 Claims, 16 Drawing Sheets

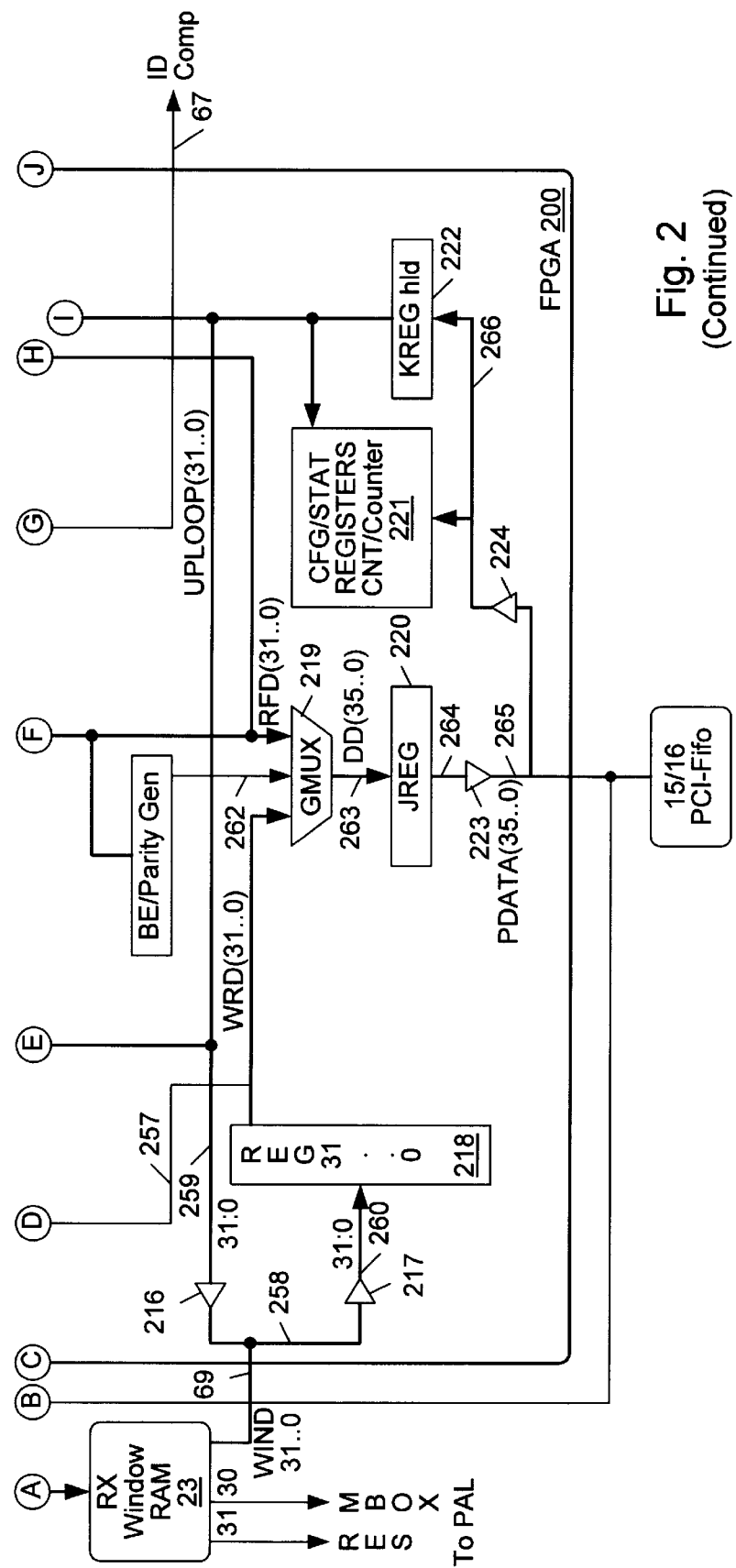

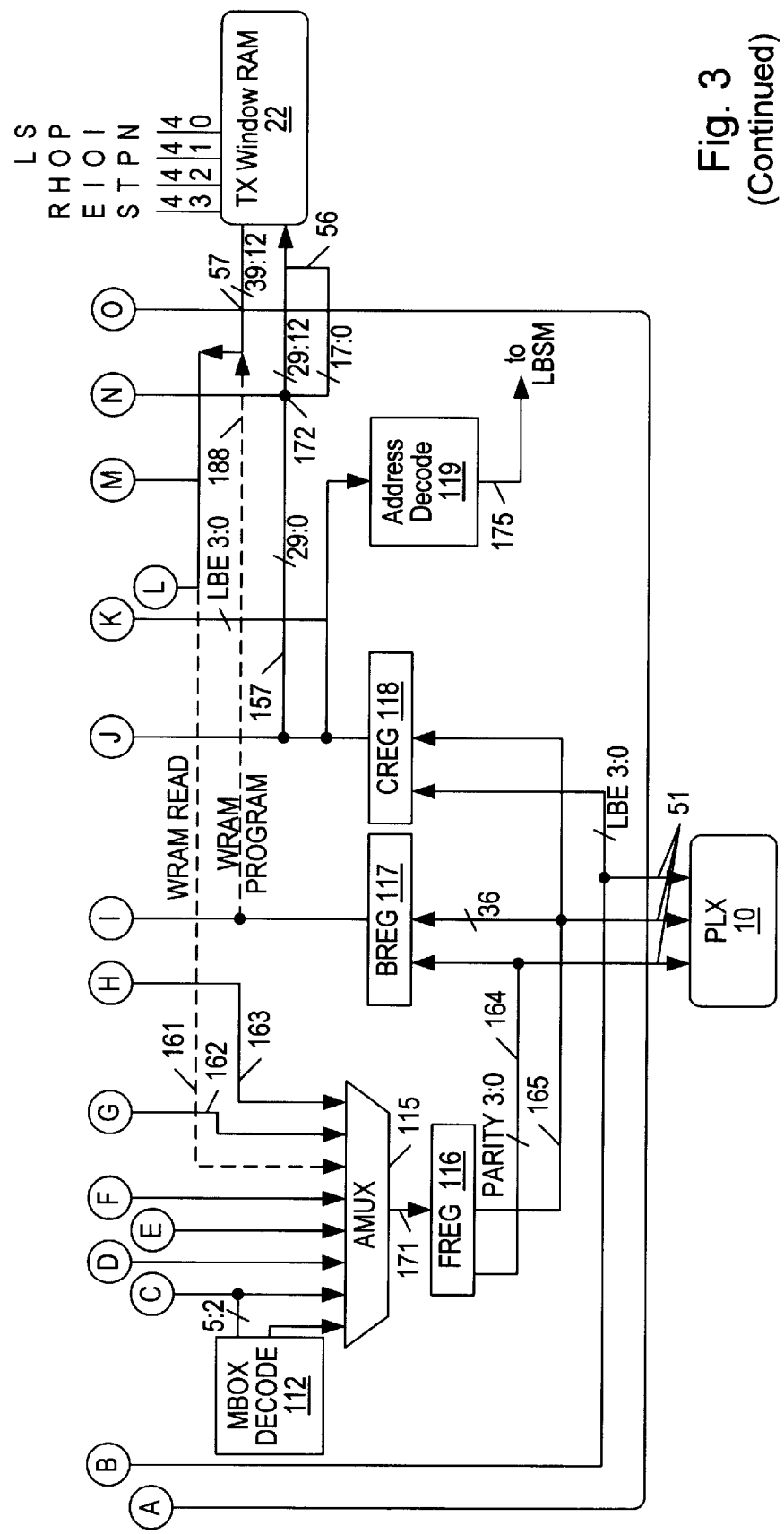

COMPUTING SYSTEM HAVING MULTIPLE NODES COUPLED IN SERIES IN A CLOSED LOOP

This application is a continuation of application Ser. No. 08/826,805, filed Mar. 25, 1997 still pending.

BACKGROUND OF THE INVENTION

1. Field of Invention

The present invention relates to a novel multiprocessor distributed memory system providing high-speed deterministic system connectivity, a novel PCI-based printed circuit board and methods therefor.

2. State of the Prior Art

Multiprocessor distributed memory systems are known and currently in wide use in the art. Such systems are characterized by certain deficiencies and can be substantially improved. For example, present systems essentially arbitrate resources in software and are slow in this respect. Since such systems are configured as loops or rings, if it is necessary to remove one of the processors, or as it is commonly referred to a node, from the loop or ring, this can only be effected by powering down the entire ring. In current systems, DMA transfers need to be sent around the entire ring thereby wasting bandwidth by transmitting past the targeted receiving node. Further, with the adoption of the PCI bus standards in PC technology, there exists a need in the art to support an effective distributed memory system.

SUMMARY OF THE INVENTION

Accordingly, it is an object of the present invention to provide a distributed memory system that will overcome the deficiencies and disadvantages of present known systems, and that will function more efficaciously and efficiently. Also, the present invention provides a novel printed circuit board that can be used in a system that includes PCI buses. The novel system of the present invention can be implemented in an electrical loop or ring or in an optical fiber loop or ring to achieve high performance and low latency by using master/master ring topology, up to 256 point-to-point flow controlled segments which can be configured to form an electrical ring up to 7.5 km in circumference or perimeter (100 feet between nodes, up to 256 nodes) or an optical ring about 750 km in circumference or perimeter. One of the principal advantages of the present invention is the ability to transfer simultaneously data from every node to traverse the entire ring (multipoint-to-multipoint). The 256 nodes are able to broadcast and receive at a given instance in time without tokens or data collisions in less than 300 microseconds. By the system of the present invention data transfers are obtainable of up to 1 Gigabaud per second with the lowest cost per connection thereby providing the capability of moving data at 100 MB per second using the fiber channel level 18b/10b coding scheme as known in the art.

The foregoing is accomplished by the present invention, in the development of a specific application of the invention by providing a unique PCI-Fiber Channel Memory Channel (PCI-FCMC) system for interconnecting standard 33 MHz PCI processor system buses to a serial Memory Channel. A novel PCI-FCMC board is provided as an element of the present invention which is a standard Type-5 form factor PCI card that occupies a single PCI slot in a standard type PC-style motherboard. The novel PCI-FCMC board provides the ability to share memory areas from within the on board memory area, from external to the board's memory area, along with the ability to provide a unique arbitration methodology. Some unique features of this novel and inventive board are a loop polling command, a DMA command queue, the ability to provide a dynamic insertion and removal of boards within an operating loop in the copper or fiber based buses without restarting the entire system, the ability to use DMA for memory areas reflected between two or more nodes, and the ability to stimulate 'Mailbox style' interrupts through the Memory Channel bus. The inventive PCI-FCMC board acts in the system like a standard memory card. Different areas of the Memory array provide different functions which provide the unique variety of features provided by this invention as will become more evident from the following description of the preferred embodiment. The 64 or 128 MByte memory array within the board provides internal shared memory between systems. 4 KB areas, while they are mapped physically within the 64 or 128 MByte memory array, can provide a function of arbitration if a configuration bit is set. Additionally the board has the ability to provide DMA driven reflected memory from any portion of the remaining addressable area of memory within the system.

A data processing system has been created comprising, a plurality of nodes, a serial data bus interconnecting the nodes in series in a closed loop for passing address and data information, and at least one processing node including; a processor, a printed circuit board, a memory partitioned into a plurality of sections, a first section for directly sharable memory located on the printed circuit card, and a second section for block sharable memory, a local bus connecting the processor, the block sharable memory, and the printed circuit board, for transferring data in parallel from the processor to the directly sharable memory on the printed circuit board, and for transferring data from the block sharable memory to the printed circuit board, and the printed circuit board having; a sensor for sensing when data is transferred into the directly sharable memory, a queuing device for queuing the sensed data, a serializer for serializing the queued data, a transmitter for transmitting the serialized data onto the serial bus to next successive processing node, a receiver for receiving serialized data from next preceding processing node, and a deserializer for deserializing the received serialized data into parallel data.

A data processing system has been created comprising; a plurality of nodes, a serial data bus interconnecting the nodes in series in a closed loop for passing address and data information, and at least one processing node including; a processor, a printed circuit board, a memory for block sharable memory, a local bus connecting the block sharable memory and the printed circuit board, for transferring data from the block sharable memory to the printed circuit board; and the printed circuit board having; a memory moving device for reading data from the block sharable memory, a queuing device for queuing the read data, a serializer for serializing the queued data, a transmitter for transmitting the serialized data onto the serial bus to next successive processing node, a receiver for receiving serialized data from next preceding processing node, a deserializer for deserializing the received serialized data into parallel data.

A data processing system has been created comprising; a plurality of nodes, a serial data bus interconnecting the nodes in series in a closed loop for passing address and data information, and at least one processing node including; a processor, a printed circuit board, a memory for block sharable memory, a local bus connecting the block sharable memory and the printed circuit board, for transferring data from the block sharable memory to the printed circuit board, and the printed circuit board having; a node ID, a memory moving device for reading data from the block sharable memory, a tagging device for tagging the block transfer with a transfer tag and destination node ID tag, a queuing device for queuing the tagged data, a serializer for serializing the queued data, a transmitter for transmitting the serialized data onto the serial bus to next successive processing node, a receiver for receiving serialized data from next preceding processing node, a deserializer for deserializing the received serialized data into parallel data, a first sensor for detecting the transfer tag, a second sensor for sensing the destination tag within the parallel data, a comparator for comparing second sensed destination tag with the node destination ID, a routing device for steering the parallel data to the transmitter if the first sensor indicates the presence of the sensed tag and comparator is not true, and a second routing device for steering parallel data to the memory if the first sensor indicates the presence of the sensed tag and comparator is true.

A data processing system has been created comprising; a plurality of nodes, a serial data bus interconnecting the nodes in series in a closed loop for passing address and data information, and at least one processing node including; a processor, a printed circuit board, a memory for block sharable memory, a local bus connecting the block sharable memory and the printed circuit board, for transferring data from the block sharable memory to the printed circuit board, and the printed circuit board having; a node ID, a memory moving device for reading data from the block sharable memory, a tagging device for tagging the block transfer with a destination node ID tag, a queuing device for queuing the tagged data, a serializer for serializing the queued data, a transmitter for transmitting the serialized data onto the serial bus to next successive processing node, a receiver for receiving serialized data from next preceding processing node, a deserializer for deserializing the received serialized data into parallel data, a sensor for sensing the destination tag within the parallel data, a comparator for comparing sensed destination tag with the node destination ID, a routing device for steering the parallel data to the transmitter if the comparator is not true, and a second routing device for steering parallel data to the memory.

A data processing system has been created comprising; a plurality of nodes, a serial data bus interconnecting the nodes in series in a closed loop for passing address and data information, and at least one processing node including; a processor, a printed circuit board, a memory for block sharable memory, a local bus connecting the processor, the block sharable memory, and the printed circuit board, for transferring data from the processor to the printed circuit board and for transferring data from the block sharable memory to the printed circuit board, and the printed circuit board having; a memory moving device for reading data from the block sharable memory, a command queuing device for storing memory move command blocks from the processor, and a memory move controller including; a sensor to determine the availability of the memory moving device, a memory move command loader which unloads commands from the command queuing device and loads the commands into the memory moving device, a queuing device for queuing the read data, a serializer for serializing the queued data, and a transmitter for transmitting the serialized data onto the serial bus to next successive processing node.

A data processing system has been created comprising; a plurality of nodes, a serial data bus interconnecting the nodes in series in a closed loop for passing address and data information, and at least one processing node including; a processor, a printed circuit board, a sharable memory, a local bus connecting the memory to the processor for transferring data between the processor and the sharable memory, and the printed circuit board having; a mapping device for assignment of mailbox tag to specific address areas, a receiver for receiving serialized data from next preceding processing node, a deserializer for deserializing the received serialized data into parallel data, a decoder for decoding the address from the deserialized parallel data of the mapping device, a sensor for detecting the decoded mailbox tag, and an interrupting device for interrupting the processor upon sensing of the mailbox tag.

A data processing system has been created comprising; a plurality of nodes, a serial data bus interconnecting the nodes in series in a closed loop for passing address and data information, and at least one processing node including; a processor, a printed circuit board, a sharable memory, a local bus connecting the memory to the processor for transferring data between the processor and the sharable memory, and the printed circuit board having; a node ID, a group of node specific information, a tagging device for tagging the node specific information with a poll tag and a destination node ID tag, a poll initiator for reading node specific information on the printed circuit board upon a prompt from the processor, a transmitter for transmitting the node specific information onto the serial bus to next successive processing node, a receiver for receiving the node specific information from next preceding processing node, a first sensor for detecting the poll tag, a second sensor for detecting destination tag, a comparator for comparing sensed destination tag with the node destination ID, and a passing device including: a first routing device for steering the node specific information to the transmitter if the first sensor detects the poll tag and the comparator is false, an appending means for appending local node specific information onto the first routed data, the transmitter for transmitting the new set of node specific information onto the serial bus to next successive processing node, and a second routing device for steering the node specific information to the memory is the first sensor detects the poll tag and the comparator is true.

A method of providing for the arbitration for resources in a system has been described, made up of a set of elements, with a ring structure comprising the steps of; allocating a unique shared memory location for each the element involved in the arbitration, determining that none of the elements owns the resource, initiating of the request for the arbitration for the resource, determining that the request has circulated around the ring, re-examining of all the elements, determining whether another element is also requesting the resource, releasing the arbitration for the resource in response to a determination that another element is also requesting the resource, winning the resource in response to determination that no other element is requesting for the resource, and using the resource.

The foregoing features and advantages of the present invention will become more apparent from the following detailed description of a preferred embodiment when taken in conjunction with the appended drawings.

DESCRIPTION OF THE PREFERRED EMBODIMENT

Figure 5:
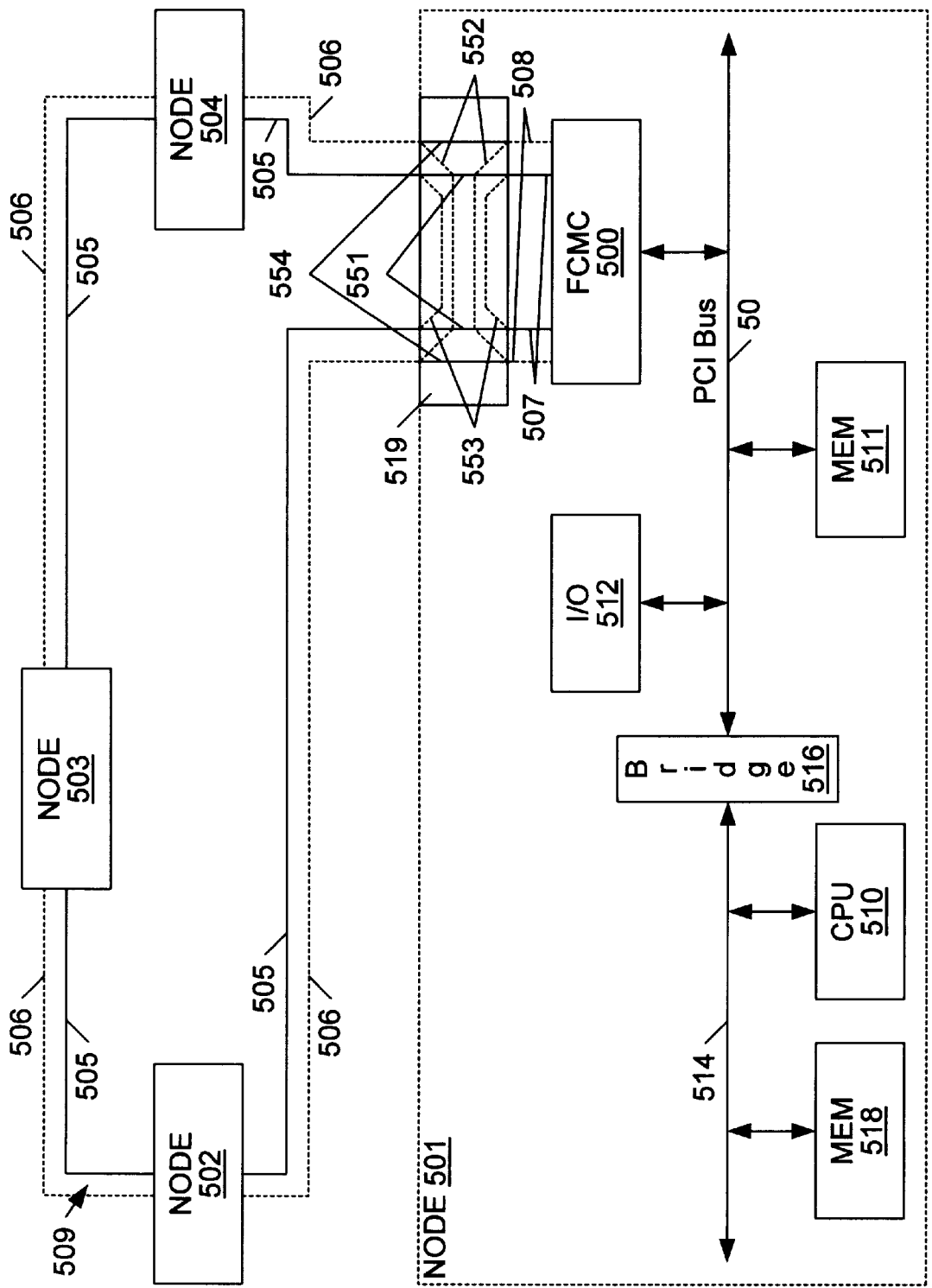
FIG. 5 a more generalized block diagram showing the system of the present invention.

Referring initially to FIG. 5, a network or ring is shown consisting of a collection of individual computers or nodes coupled by serial memory channel loop or ring 509, which may take the form of a pair of optical or electrical buses. As shown in FIG. 5, up to 256 nodes, only four of which are schematically illustrated and designated by the reference numerals 501, 502, 503, and 504, can be serially connected. In the optical implementation, the interconnected nodes are coupled serially by single mode optical fibers 505 and Multimode optical Fibers 506, for data and flow control, respectively. Each node, as shown in FIG. 5, is an individual computer containing at a minimum a standard 33 MHz PCI system bus 50, and a CPU 510, a memory 511, and an I/O 512 all coupled to the bus 50. In particular, the CPU 510 has CPU memory 518 connected to the CPU by a private memory bus 514 which also connects via PCI Bridge chip 516 to the PCI bus 50. In addition, a fiber channel memory channel board 500 connects the PCI system bus 50 to the serial memory channel loop 509. Each node is provided with its own 8-bit Node ID. Although up to 256 nodes are described herein as individual computers, some or all of them can be interconnected in other supplementary known ways without departing from the teachings of the present invention. Each node essentially comprises what is known in the art as a personal computer or server. At a minimum, each node can consist of board 500, PCI bus 50 and one of the CPU 510, an input only I/O function, or an output only I/O function 512. Additionally, each node can contain a switch mechanism 519. This mechanism provides for a feed through path 553 for the single mode fiber, and 552 for the multimode fiber. It also provides the alternative paths 551 for the single mode fiber connecting single mode fiber optic cable 505 to cable 507, and 554 for the multimode fiber connecting multimode fiber optic cable 506 to cable 508.

Figure 1:
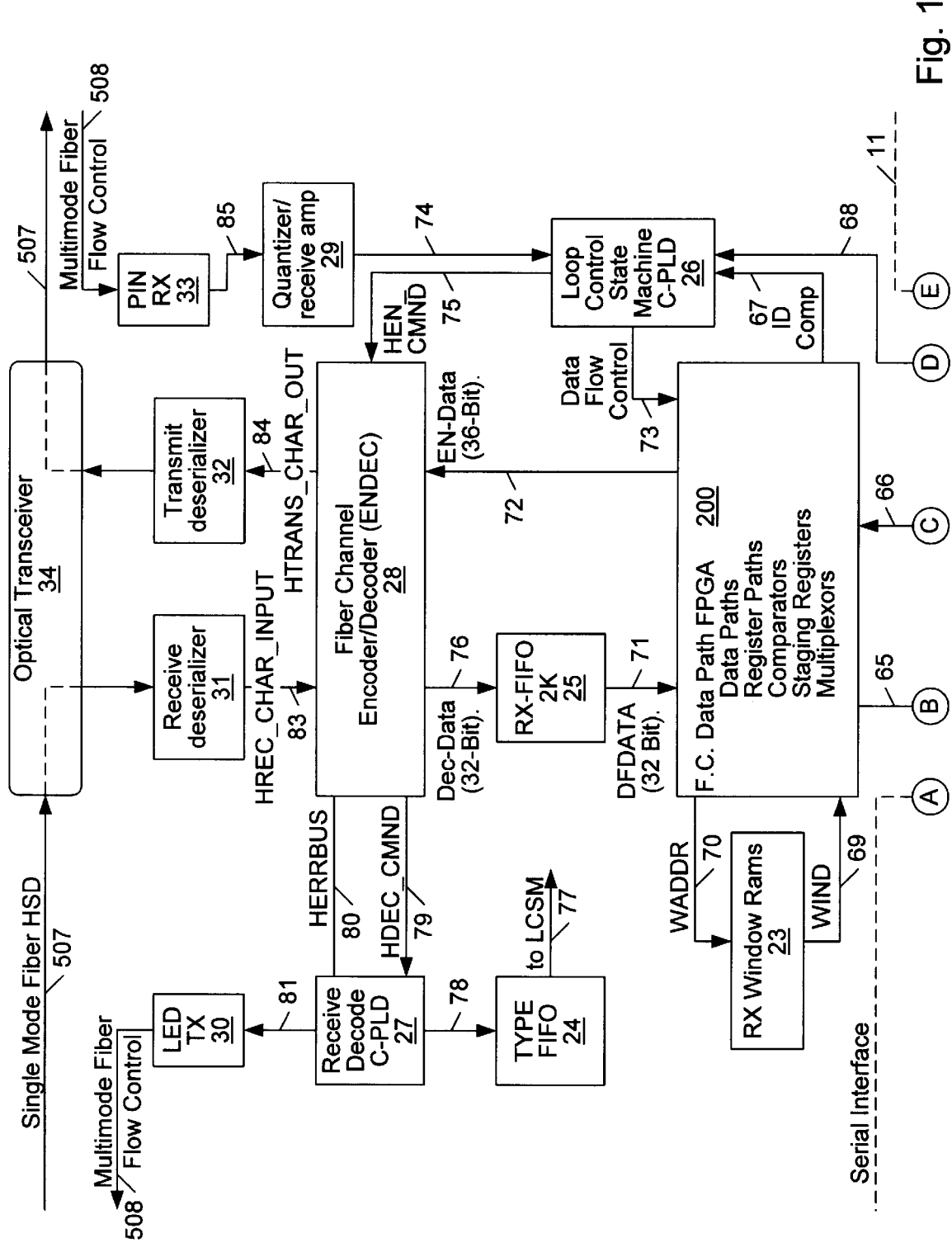
FIG. 1 is a block diagram showing the novel inventive system and board.
Figure 1:
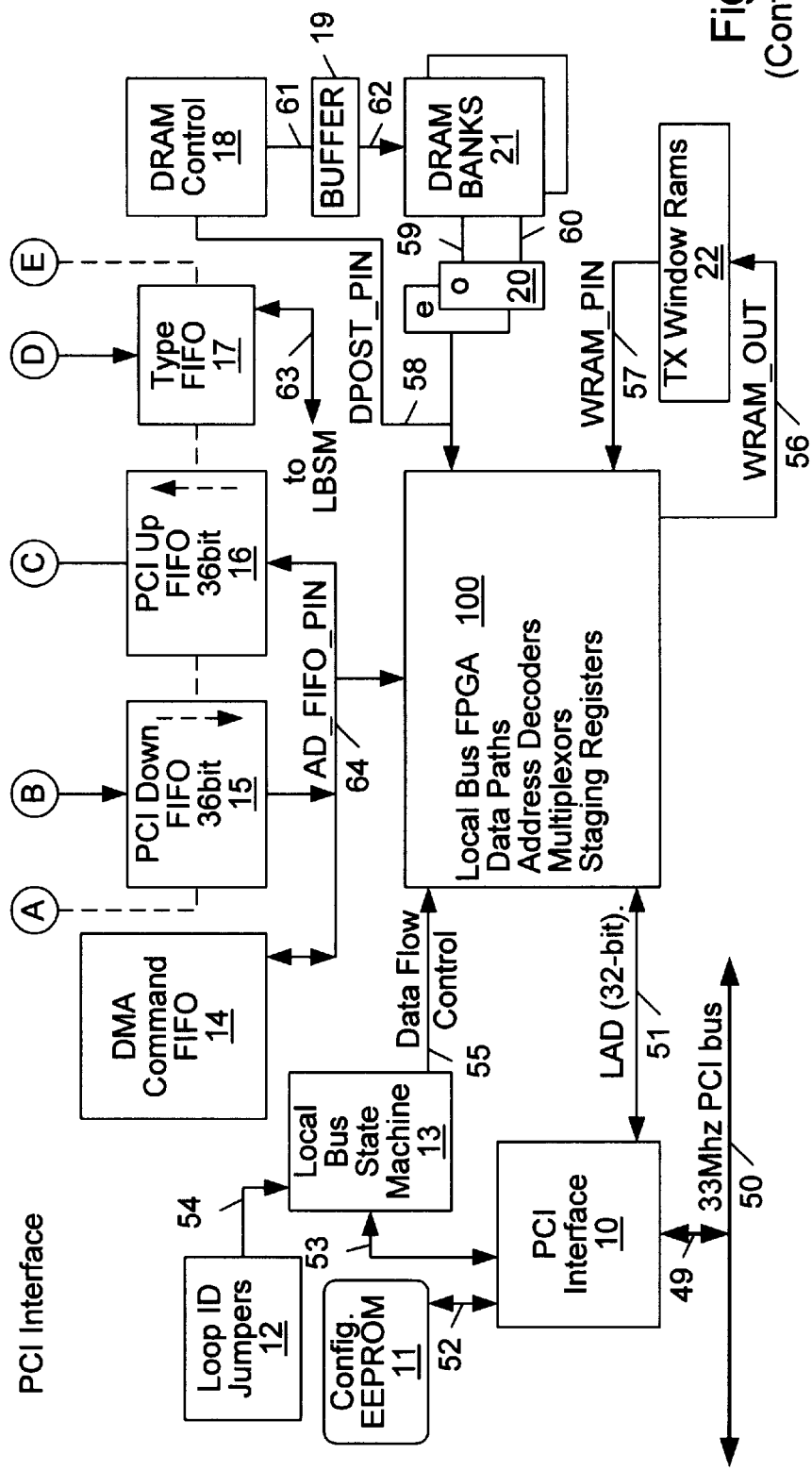

Referring to FIG. 1, the fiber channel memory channel board 500 will now be described in detail. As already mentioned, board 500 provides an interconnection or data pathway between the PCI system bus 50 to serial loop 509. Board 500 is a standard Type-5 form-factor PCI card that occupies a single PCI slot in a standard type PC-style motherboard (not shown). Board 500 is provided with optical transceiver 34 which is connected to single mode optical fibers 507 and Pin Diode 38 and LED Transmitter 30, which is connected to multimode optical fibers 508. Optical transceiver 34 is connected to Receive Deserializer 31 via bus 86 and to Transmit Serializer 32 via bus 87. Fiber channel encoder/Decoder (ENDEC) 28 is connected to Receive Deserializer 31 via HREC_CHAR_INPUT bus 83 and to Transmit Serializer 32 via HTRANS_CHAR_OUT bus 84. ENDEC 28, for example, model VSC7107QC from Vitesse Semiconductor Corp., is connected via 32 bit Dec-Data bus 76 to 2 KW deep RX-FIFO 25 which in turn is connected to Fiber Channel Data Path FPGA 200 via 32 bit DFDATA bus 71. FPGA 200 provides data paths, staging registers, register file, multiplexors and comparators. ENDEC 28 is also connected to FPGA 200 via 36 bit EN-Data bus 72. ENDEC 28 connects to decode control Receive Decode C-PLD 27, a programmable logic device, via HERRBUS 80 and HDEC_CMND bus 79 and also is connected to Loop Control State Machine C-PLD (LCSM) 26 via HEN_CMND bus 75. FPGA 200 is connected to RX Window RAM 23 via buses WMD bus 69 and WADDR bus 70. FPGA 200 is also connected to 36 bit PCI DOWN FIFO 15 via bus 65 and to 36 bit PCI Up-FIFO 16 via bus 66. Loop Control State Machine 26 is connected to ENDEC 28 via bus 75 and FPGA 200 via Data Flow Control bus 73 and ID Comp bus 67. Also, Loop Control State Machine 26 is connected to Quantizer Receive Amplifier 29 by bus 74 and to Type FIFO 17 by bus 68. Quantizer Receive Amplifier 29 is a Quantizer/amplifier, well known in the optical fiber art, and is the interface used when using a pin diode as a receiver. Quantizer Receive Amplifier 29 is a full function receiver in which all components are integrated together in a known manner. Quantizer Receive Amplifier 29 is connected via bus 85 to pin diode receiver Pin RX 33 which receives multimode fiber flow control via bus 506, to provide messaging from a downstream node to its associated upstream node indicating that its FIFOs are full and to temporarily stop transmission.

Decode control 27 is connected by bus 81 to LED transmitter 30 which feeds multimode fiber flow control via bus 506. Control 27 is also connected to Type FIFO 24 via bus 78, which in turn is connected to the Loop Control State Machine 26 via bus 77. The bidirectional FIFOs 15, 16, and 17 divide board 500 into two sections as indicated by dotted line 11. The section portrayed above the dotted line 11 in FIG. 1 is the Serial interface, see legend, and the lower section portrayed below the dotted line 11 is the PCI interface, see legend.

PC DOWN FIFO 15, PCI Up-FIFO 16, and DMA Command FIFO 14 are all connected to AD_FIFO_PIN bus 64 which in turn is connected to Local Bus FPGA 100. FPGA 100 is connected to DPOST_PIN bus 58 which in turn is connected to DRAM Control 18 and to odd and even registers 20. Odd and even registers 20 are connected to DRAM banks 21 via even bus 59 and odd bus 60. DRAM Control 18 is connected to DRAM Bank 21 via bus 61, buffer 19 and bus 62. Type FIFO 17 is connected to Local Bus State Machine 13 via bus 63. FPGA 100 provides data paths, staging registers, multiplexors and address decoders.

FPGA 100 is connected to TX Window RAM 22 via buses WRAM_OUT bus 56 and WRAM_PIN bus 57. PCI Interface chip (Obtainable from PLX Technologies, Model PLX9060) 10 a conventional PCI bridge, is connected to FPGA 100 via 32 bit LAD bus 51. PCI Interface 10 is also connected to Configuration EPROM 11 via bus 52, Local Bus State Machine 13 via bus 53 and to PCI bus 50 via the usual connectors generally designated as 49. EPROM 11 contains the basic configuration of the PCI interface 10 so a bus master can interrogate. The PCI 10, when powered up, fetches information from the EPROM 11 and puts the data in its internal registers to be available on system interrogation. Local Bus State Machine 13 is connected to FPGA 100 via Data Flow Control bus 55. Loop ID Jumpers 12, which contain the node address of the associated node only, is connected to the Local Bus State Machine 13 via bus 54.

Figure 2:
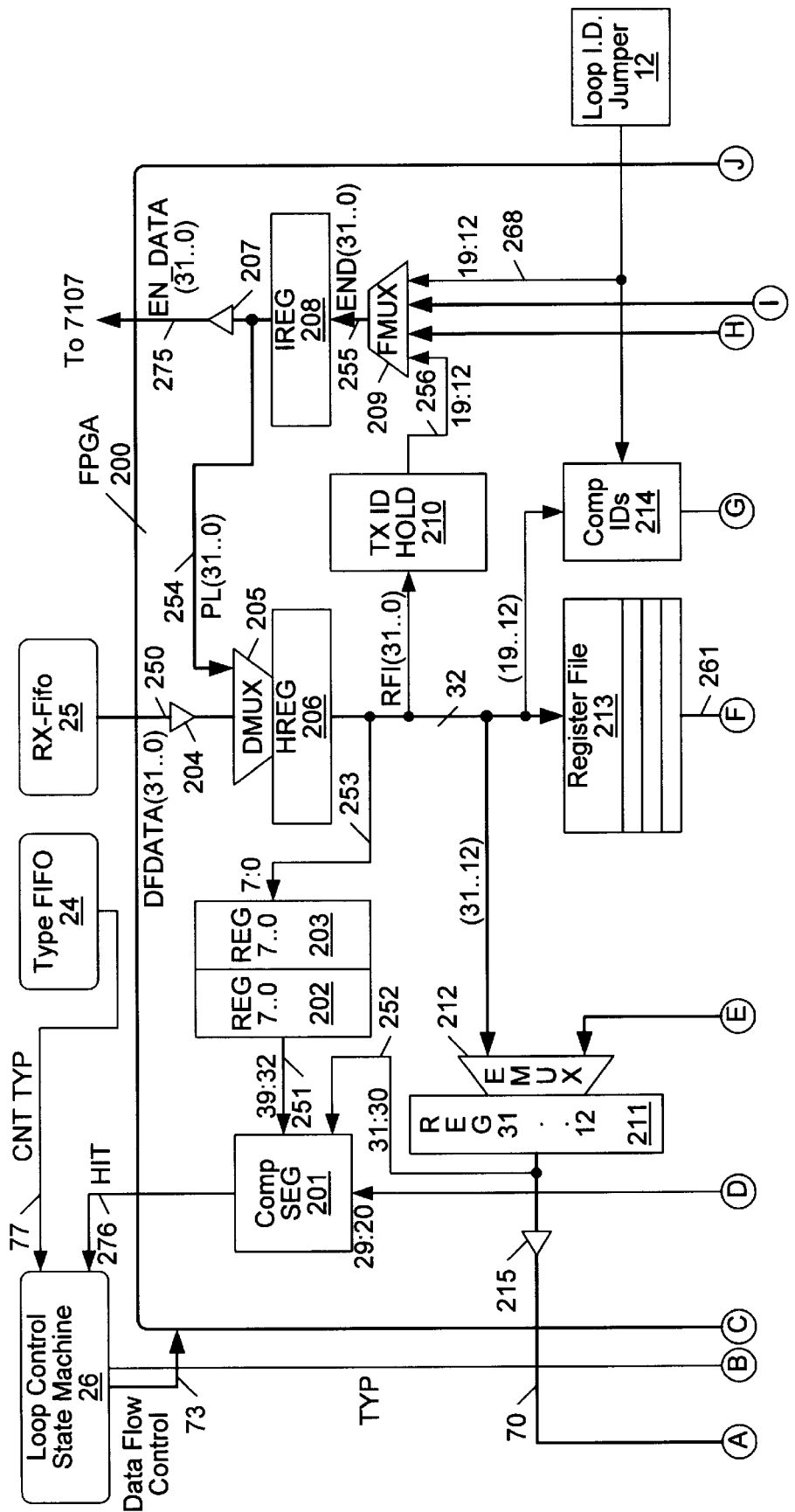
FIG. 2 is a block diagram showing the details of internal operation of one of the field programmable ate arrays included on the board.
Figure 3:
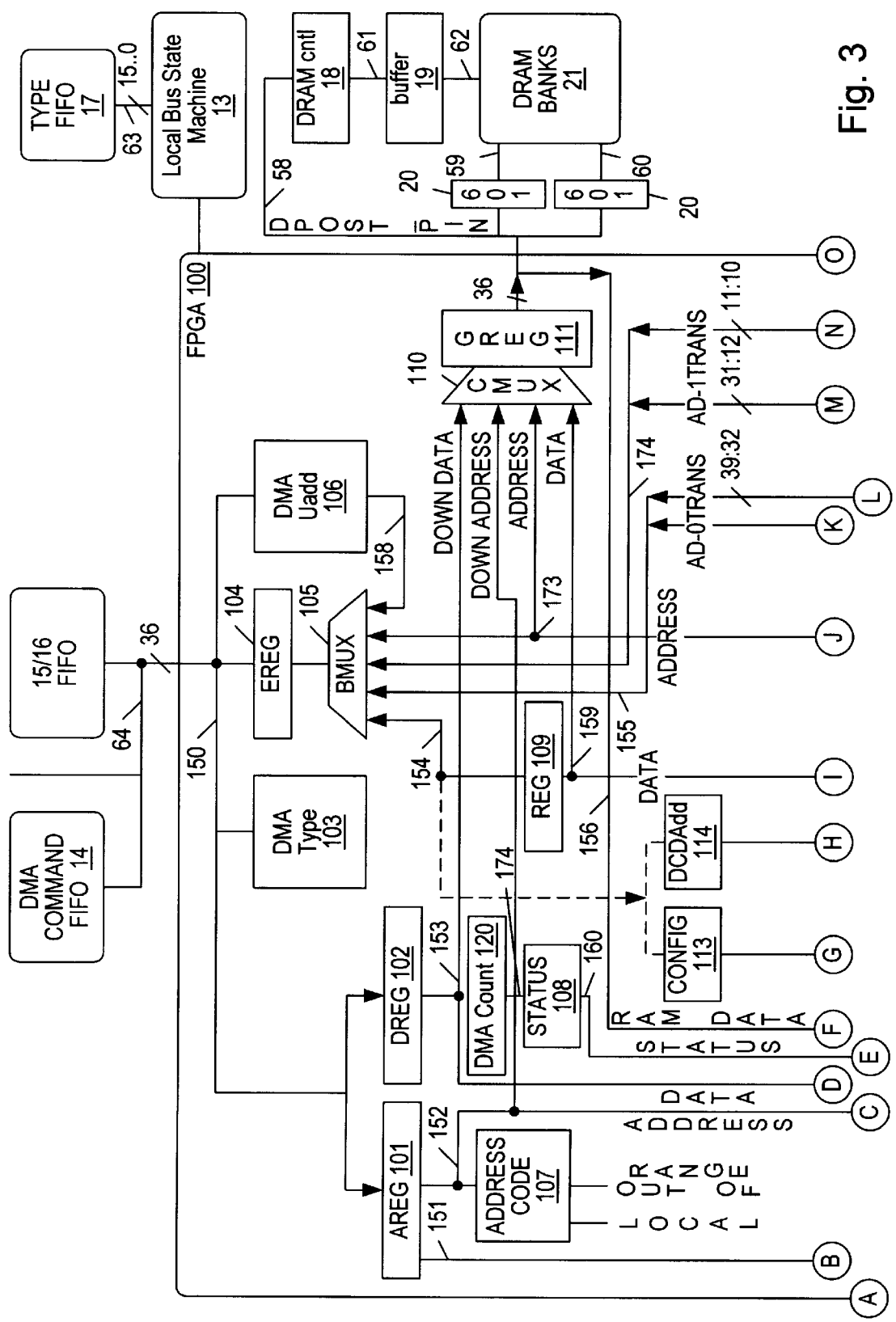
FIG. 3 is a block diagram showing the details of internal operation of the other field programmable gate arrays included on the board.

The FPGA 100 and 200 are field programmable gate arrays, known in the art are obtainable from Lucent Technologies, model number OR2C15A-4S B352. Their programmed state, according to the present invention, is shown in FIGS. 3 and 2, respectively. Referring now to FIG. 3, the FPGA 100 will be described in detail. This chip is programmed to contain registers BREG 117 and CREG 118 which both receive input from PCI Interface chip 10 via bus 165, bus 151 (active low byte enable control bits LBE 3:0) and bus 164 (parity bits 3:0). Bus 151 also connects to AREG 101. AMUX 115 is connected to FREG 116 by bus 171. CREG 118 is connected to BMUX 105 via bus 157 which also connects to Address Decode 119, TX Window RAM 22 (bits 29:0 to junction point 172 and thereafter bits 29:12), and CMUX 110 from junction point 173 to transmit address. GREG 111 is directly connected to CMUX 110 and also is connected to DRAM Banks 21 via bus 156 which also connects to AMUX 115 to forward RAM data. EREG 104 is connected to BMUX 105 and also via bus 150 to FIFOs 15 and 16, DMA Command FIFO 14 and AREG 101 and DREG 102 and DMA Type 103 and DMA Uadd 106 which handles the 8 bit upper address 39–32. DMA Uadd 106 is connected to BMUX 105 via bus 158. AREG 101 connects to Address Decoder 107 via bus 152 which also connects to AMUX 115 and CMUX 110 to provide address and down address, respectively. DREG 102 connects via bus 153 to AMUX 115, CMUX 110, to provide data and down data, respectively. Status 108 is sourced by DMA Count 120 via bus 174 and other singular sources. MBOX DECODE 112 is connected to bus 152 and to AMUX 115. Bus 154 connects BMUX 105 to REG 109 and Config 113 and DCDAdd 114 which in turn connect to AMUX 115 by buses 162 and 163. Bits 7:0 from bus 57 and LBE 3:0 from bus 157 are connected to BMUX by bus 155. Bits 31:12 from bus 57 and bits 11:0 from bus 157 connect to BMUX by bus 174. WRAM READ Bus 161 connects AMUX 115 to TX Window Ram 22 to furnish WRAM data. WRAM PROGRAM bus 188 interconnects data bus 159 to TX Window RAM 22. Status 108 connects via bus 160 to AMUX 115. REG 109 is connected to BREG 117 and CMUX 110 furnishing data via bus 159. The coupling of the FPGA 100 to the DMA COMMAND FIFO 14, FIFOs 15 and 16, Type FIFO 17, Local Bus State Machine 13, DRAM Banks memory 21, DRAM control 18 (a Lattice PAL device), the TX Window RAM 22 and the PCI Interface 10 is shown in FIG. 3.

As shown in FIG. 3, TX Window RAM 22 is provided with map block context bits spin, loop, hit and RES which correspond to bit positions 40–43, respectively of the word format. Also, Address Decode 107 generates two unitary control bits, namely, local and out-of-range. Address Decode 119 generates 4 encoded bits to the Local Bus State Machine via bus 175.

Referring now to FIG. 2, the FPGA 200 will be described in detail. The chip is programmed to couple with the up/down FIFOs 15 and 16 via bus 265 and buffer 223, which couples to JREG 220 which couples to GMUX 219 via bus 263. Branching off bus 265 is buffer 224 which connects to bus 266 leading to CFG/STAT REGISTERS, CNT/Counters 221 and KREG hld 222. RX FIFO 25 couples to the chip via DFDATA bus 250 (bits 35..00) through buffer 204 to DMUX 205 directly connected to HREG 206. PL bus 254 (bits 35..0) feeds from the upstream side of IREG 208 which receives via END bus 255 (bits 35..0) from FMUX 209. IREG 208 feeds buffer 207 which outputs on EN_DATA bus 275 (bits 35..0). The downstream side of HREG 206 is connected to Register File 213 via RFI bus 253 (bits 31..0). Bus 253 also connects to REG 203 for bits 7..0 to TX ID Hold 210 for bits 19..12, to Comp Ids 214 for bits 19..12 and to EMUX 212 for bits 31..12. REG 203 connects to REG 202 and then to Comp Seg 201 bits 39:32 via bus 257. TX ID Hold 210 connects to FMUX 209 via bus 256 for bits 19..12. EMUX 212 is coupled to REG 211 or bits 31..12 and the downstream side of REG 211 is coupled to Comp SEG 201 via bus 252 for bits 31:30, and to buffer 215 which is coupled to RX Window RAM 23 which generates offset addresses and context bits MBOX (bit 30) and RES (bit 31). RAM 23 is connected by WIND bus 60 and 258 (bits 31..0) to buffers 216 and 217, the latter connected to REG 218 for Bits (31..0) via bus 260. REG 218 is connected to GMUX 219 via WRD bus 257 (31..0) and to Comp SEG 201 for bits 29..20. Register file 213 is connected to GMUX 219 by RFD bus 261(31..0) which also connects to BE/Parity Gen which in turn connects to GMUX 219 via bus 262. Bus 261 also connects to FMUX 209. UP Loop bus 259 is connected to buffer 216, FMUX 209, EMUX 212, Registers 221 and KREG hid 222. Bus 268 connects Comp Ids 214 to Loop ID Jumpers 12 and FMUX 209 Bits 19:12. Data flow control 73 is provided by the Loop Control State Machine 26 as indicated. Hit bit 276 generated by Comp SEG 201 is fed to LCSM 26. TYPE FIFO 24 sends CNT TYP bits to LCSM 26 on bus 77.

The function and purpose of the TYPE FIFO 17 will be apparent from the following table.

The PCI_TYP bits of TYPE FIFO 17

| 17->15 | 14 | 13 | 12 | 11 | 10 | 9 | 8 | 7->0 |
|---|---|---|---|---|---|---|---|---|
| reserved | MC-PPDMA UP | LPOLL UP | LOOP UP | P-PDMA UP | MBOX DOWN | SPIN UP | FOK UP | PCI_CNT BI-DIR |

Wherein MC-PPDMA bit 14 is used for Point-to-Multipoint DMA; LPOLL bit 13 is used for loop poll for identifying nodes during initialization; bit 12 is used for the loop up function where the data goes from the PCI bus 50 back to the PCI bus 50; P-PDMA bit 11 is used for Point-to-Point DMA; MBOX bit 10 is used for Mailbox; SPIN bit 9 is used for the spin lock function; FOK bit 8 is used to indicate a bad packet; and PCI_CNT bits 7 to 0 constitute an eight bit count created by the state machine for up to 256 DMA transfers. Each count represents a single 32 bit entry. The loop functionality provides a way where by when data are written to the fiber optic link 509, they can be also copied out on another area of the PCI bus to provide a usable second copy of the data. The address of the alternate 4K region is provided by the RX Window RAM 23 as the packet is 'looped back' from the transmit path onto the receive path back to the PCI bus. The FOK bit in the TYPE FIFO provides a mechanism to alert the serial section that a packet which is in the UP FIFO 16 is for some reason invalid. For example, this could be because during the block move of data that a non-present area of memory was addressed, or that a parity error occurred during the data phase of the transfer.

The Down Type bits of TYPE FIFO 24 are explained in the following table:

|  | dtyp1 | dtyp0 | FOK |
| --- | --- | --- | --- |
| Data Frame | 0 | 0 |  |
| Reserved | 0 | 1 | 1=ok |
| Loop poll frame | 1 | 0 | 0=bad |
| Reserved | 1 | 1 |  |

FIGS. 6 to 12 show the various functions of the Local Bus State Machine 13, the DRAM Control 18, the Receive Decode 27 and the Loop Control State Machine 26. Referring to these figures the various functions will be described in detail.

Figure 6:
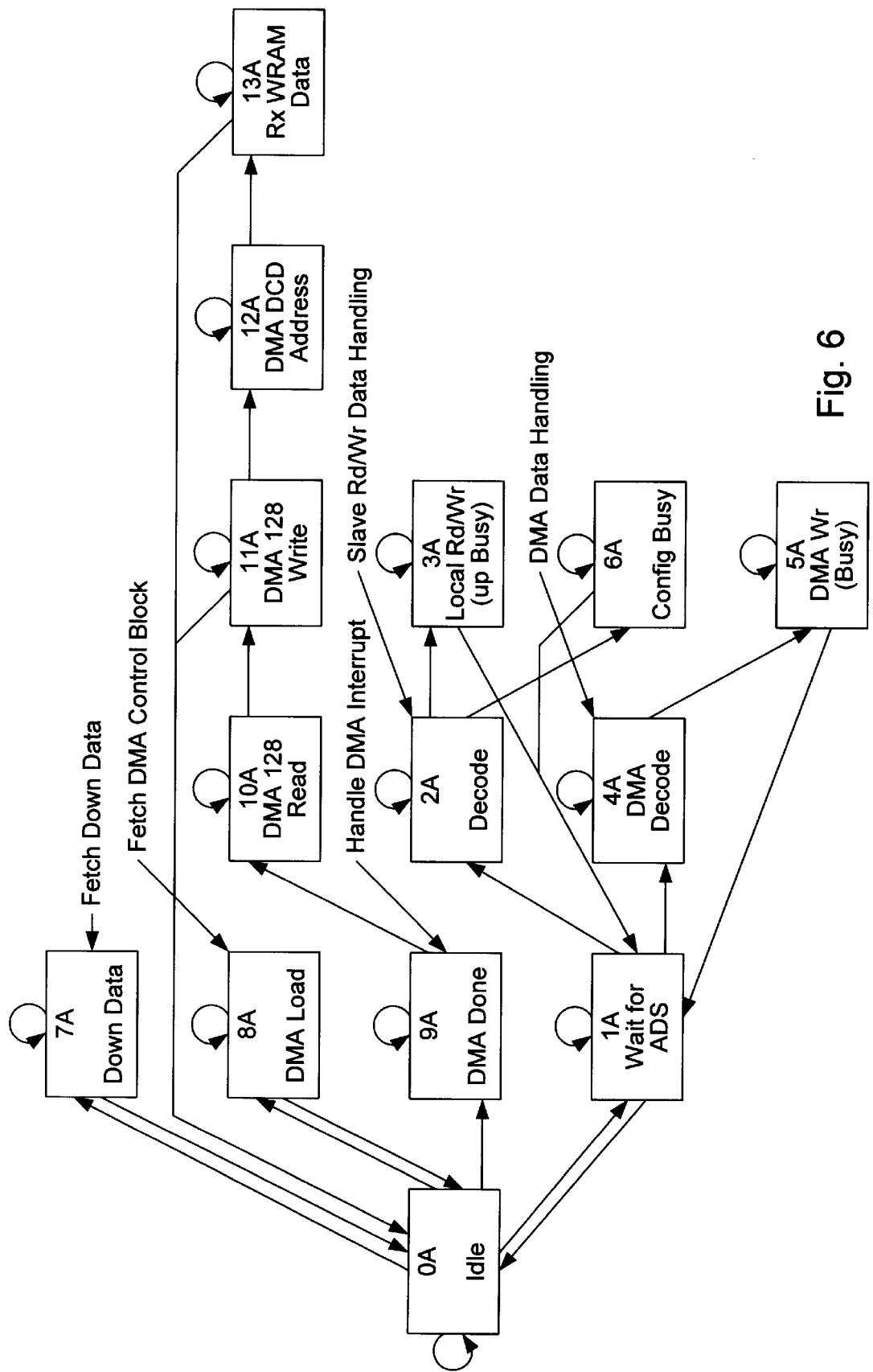
FIG. 6 is a state diagram showing the local bus arbitration state machine function of the local bus state machine incorporated on the board of FIG. 1.
Figure 7:
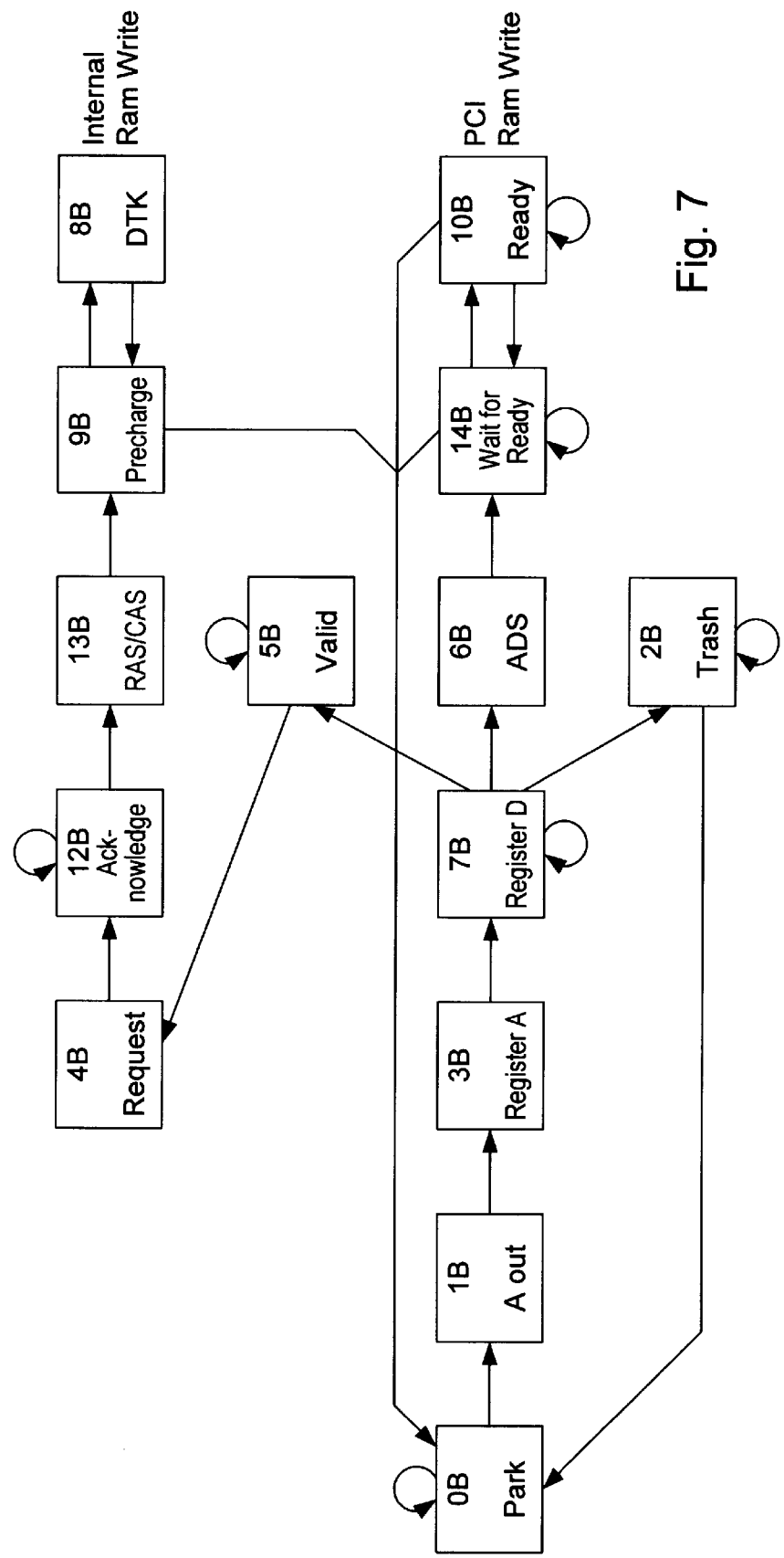
FIG. 7 is a state diagram showing the down state machine function of the local bus state machine incorporated on the board of FIG. 1.
Figure 8:
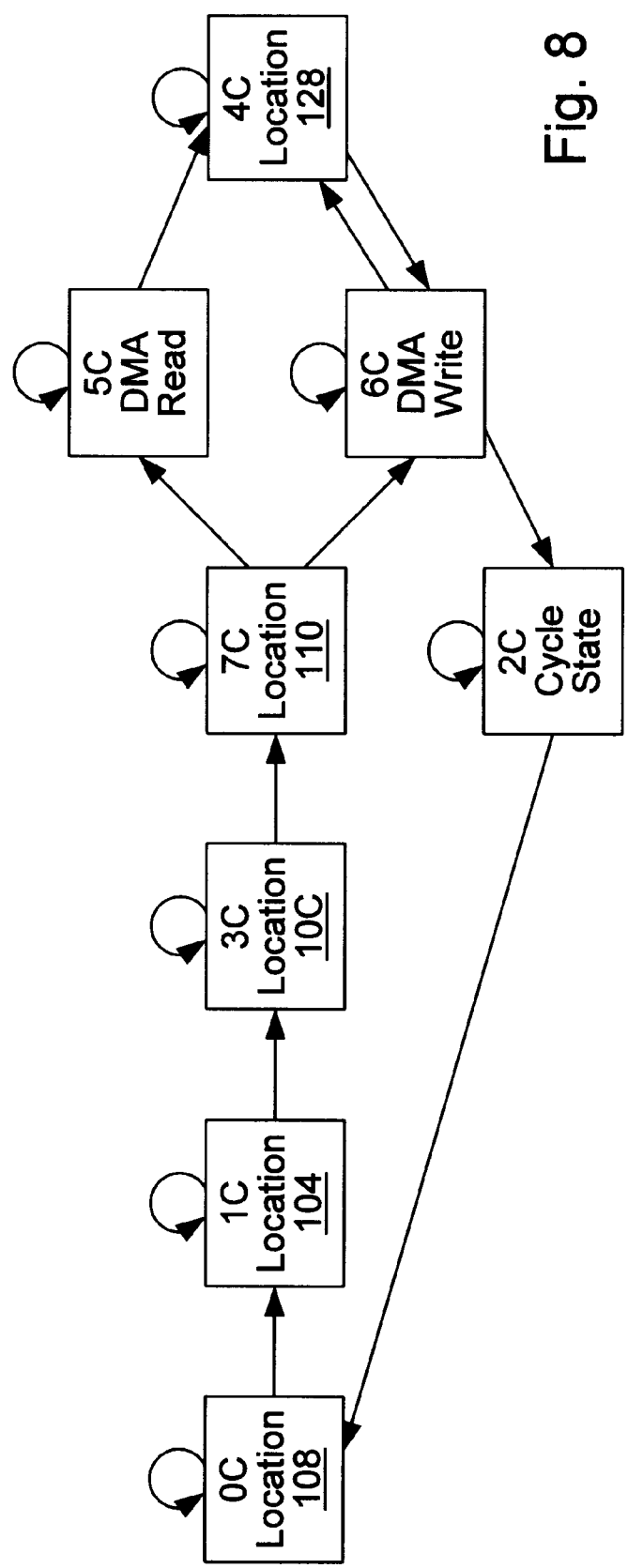
FIG. 8 is a state diagram showing the DMA program state machine function of the local bus state machine incorporated on the board of FIG. 1.
Figure 9:
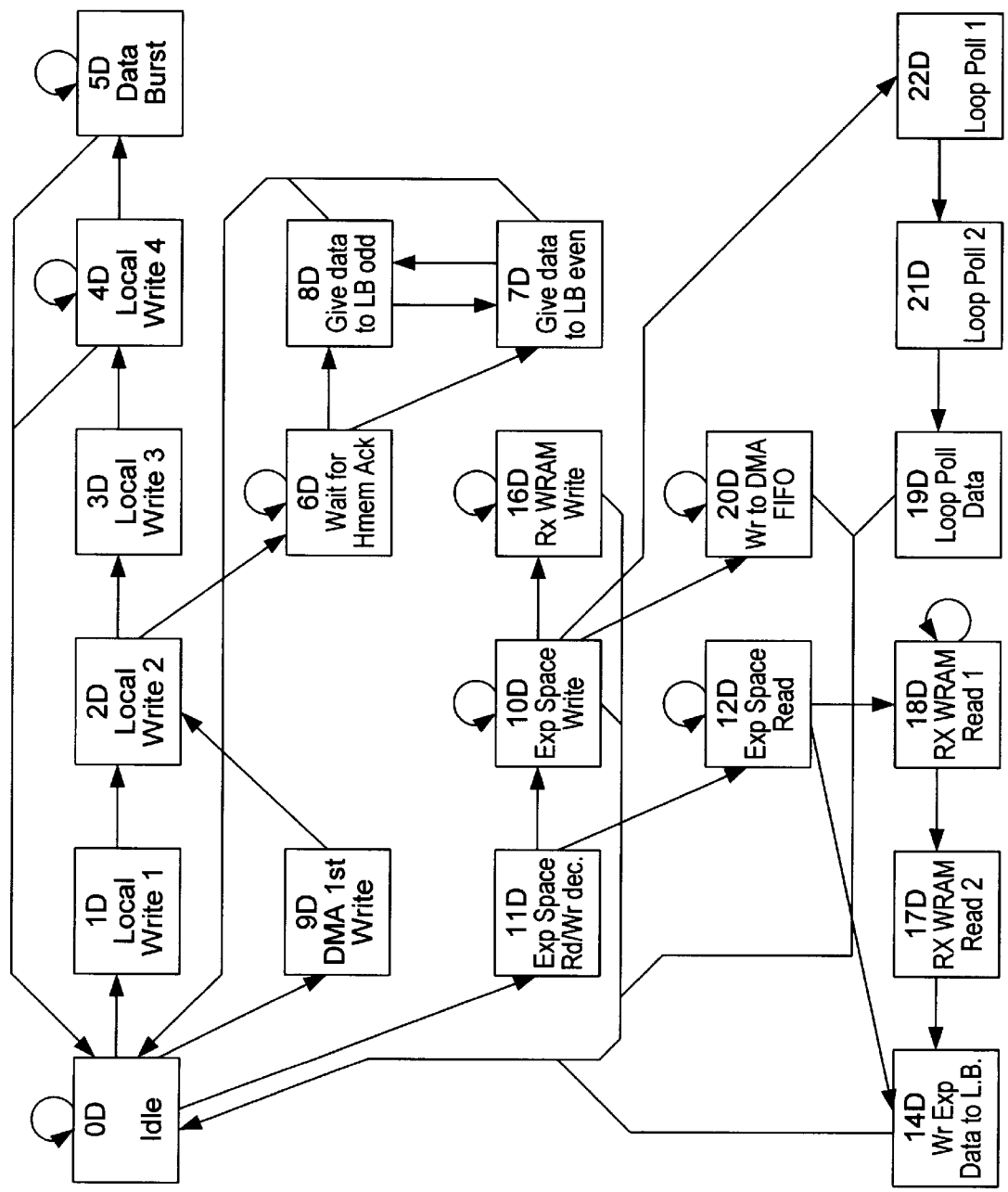
FIG. 9 is a state diagram showing the up FIFO state machine function of the local bus state machine incorporated on the board of FIG. 1.

Local Bus Arbitration State Machine (LBASM)—As shown in FIG. 6, the LBASM provides signals which initiate actions within the DMA Program State Machine (DPSM) FIG. 8, Down State Machine (DSM) FIG. 7, and the Up FIFO State Machine (UFSM) FIG. 9. Upon reset and in between actions, the LBASM resides in the Idle state (S0A). Upon detection of data in the PCI Down FIFO 15, the LBASM moves into the Down Data State (S7A), and signals the DSM. It stays in this state until the data movement is completed by the DSM described later. Upon completion, the state machine returns to the Idle State (S0A). If a valid command set is detected within the DMA Command FIFO 14, the state machine moves to the DMA Load State (S8A) and signals the DMA Program State Machine (DPSM). It stays in this state until the data movement is completed by the DPSM described later. Upon completion, the state machine returns to the Idle State (S0A). If DMA completion is detected, the LBASM moves to the DMA Done State (S9A). It then moves to the DMA 128 Read State (S10A) where it reads the status register from the PCI Interface chip 10. It then moves to the DMA 128 Write State (S11A) where it writes a value which clears the pending interrupt. If the 'write external status location' option is enabled the state machine moves to the DMA DCD Address State (S12A) which sets up the external address in which the data are to be written. It then moves to the DMA DCD Data State (S13A) which provides the data to be written. The state machine stays in this state until the data are written into memory and returns to the Idle State (S0A). If the LBASM detects a direct slave or DMA request from the internal Local Bus 51, the state machine moved to the Wait for ADS state (S1A). From there if the ADS was due to a slave memory access, the state machine moves to the Decode state (S2A). Here it determines whether the access is a local memory read/write, or a config/WRAM read/write. If the transfer is a local memory read/write, the state machine moves to the Local Rd/Wr State (S3A) where it signals the Up FIFO State Machine (UFSM) to transition to (S1D). Upon completion of the transfer, the state machine moves to the Wait for ADS State (S1A) to wait for more data. If there is no more data, the state machine moves back to the Idle state (S0A). If when the state machine was in the Decode (S2A), the transfer was determined to be for the Config RAM or WRAM's, the state machine moves to the Config Busy State (S6A), and signals the UFSM to transition to (S11D). It stays in this state until the individual Read/Write cycle is completed, and then returns to the Wait for ADS State (S1A) to wait for more data. If there is no more data, the state machine moves back to the Idle state (S0A). If when the state machine is in the Wait for ADS State (S1A), and it is determined that the access is due to a DMA action, the state machine moves to the DMA Decode State (S4A) where it signals the UFSM to transition to (S9D). It then proceeds to the DMA Wr State (S5A) where the state machine waits for the completion of the transfer. Upon completion of the transfer, the state machine moves to the Wait for ADS State (S1A) to wait for more data. If there is no more data, the state machine moves back to the Idle state (S0A).

Down State Machine (DSM)—As show in FIG. 7, upon reset and in between actions, the DSM resides in the Park state (S0B). Upon detection of the signal from the LBASM, the state machine moves to the A out State (S1B) where it dequeues the address from the down FIFO 15. It then moves to the Register A state (S3B) where it stores the Address into the AREG 101 and dequeues the data from the PCI Down FIFO 15. It then moves to the Register D State (S7B) where it stores the Data argument into the DREG 102. The Address Decode 107 provides the discrimination between the internal and external address ranges. These data are then used to decide the next state. If the data are for PCI memory, the state machine moves to the ADS state (S6B) where it drives the ADS signal on the LAD bus (51). It then moves to the Wait for Ready state (S14B) while presenting the data on the LAD bus (51). When the Ready line is returned from the PCI Interface chip (10), the state machine moves to the Ready state (S10B). If there is more data, the state machine moves to the Wait for Ready state (S14B) to present the next word of data, or if this is the last word of data, it returns to the Park State (S0B). If the Address Decode 107 determines that the data are for the internal RAM, the state machine moves from (S7B) to the Valid State (S5B). It next moves to the Request State (S4B) where it requests the Internal SRAM resource. The State machine then moves to the Acknowledge state (S12B) where it waits for the indication that the resource has been granted. When the resource is granted, the state machine moves to the RAS/CAS state (S13B) where the data array is accessed, and then moves to the Precharge state (S9B). If there is more data to be written into the array, the state machine moves into the DTK state (S8B) where the memory array is accessed, and then it moves back to the Precharge state (S9B). If the last word of data has been moved, the state machine moves back to the Park state (S0B). Finally, if the data in the PCI down FIFO 15 for any reason is corrupted, the state machine moves from (S7B) to the Trash state (S2B) where it dequeues the data from the PCI down FIFO 15.

DMA Program State Machine (DPSM)—As show in FIG. 8, upon reset and in between actions, the DPSM resides in the Location 108 state (S0C). Upon detection of the signal from the LBASM, the DMA register within the PCI Interface chip 10 at location 108 is written. When the data are accepted, the state machine moves to the Location 104 state (S1C) and commences writing of that location. When those data are accepted, the state machine moves to the Location 10C state (S3C) and commences writing of that location. When those data are accepted, the state machine moves to Location 110 state (S7C). Depending on the function being performed, (DMA read or DMA write), the state machine moves to the DMA Read state (S5C) or DMA Write state (S6C) respectively, and writes the register. When those data are accepted, the state machine moves to Location 128 state (S4C) and writes the register to initiate the DMA action. When that datum is accepted, the state machine returns to the DMA Write state (S6C), and then proceeds to the Cycle Start (S2C). The state machine then proceeds to the Location 108 state (S0C) in preparation for the next DMA action.

Up FIFO State Machine (UFSM)—As show in FIG. 9, upon reset and in between actions, The UFSM resides in the Idle state (S0D). Upon detection of a signal from the LBASM indicating a Local Write, the state machine moves to the Local Write 1 state (S1D) where it loads the first address argument into the PCI Up FIFO 16. It next moves to the Local Write 2 state (S2D) where it loads the second address argument. If the transfer is a write, then it moves to the Local Write 3 state (S3D), then to the Local Write 4 State where it load the data argument into the PCI Up FIFO 16. It then waits for the memory acknowledgment indication at which time it moves to the Data Burst State (S5D) where it loads all remaining arguments into the PCI Up FIFO 16. When the last data argument has been loaded and acknowledged, the state machine moves back into the Idle state (S0D). Upon detection of a signal from the LBASM indicating a DMA Operation, the state machine moves to the DMA 1$^{st}$ Write state (S9D) where it loads the first address argument into the PCI Up FIFO 16. It next moves to the Local Write 2 state (S2D) where it loads the second address argument. It moves to the Local Write 3 state (S3D), then to the Local Write 4 State where it loads the data argument into the PCI Up FIFO 16. It then waits for the memory acknowledgment indication at which time it moves to the Data Burst State (S5D) where it loads all remaining arguments into the PCI Up FIFO 16. When the last data argument has been loaded and acknowledged, the state machine moves back into the Idle state (S0D). Upon detection of a signal from the LBASM indicating a Local Read, the state machine moves to the Local Write 1 state (S1D) where it suppresses the Address load into the PCI Up FIFO. It then moves to the Local Write 2 state (S2D) again suppressing the load into the FIFO. It next moves to the Wait for Hmem Ack state (S6D) where it waits for the access to the Memory Array 21. When access is achieved, the state machine moves to the Give Data to LB Odd (S8D) or Give Data to LB Even (S7D), respectively, depending upon the address of the read transaction. If multiple arguments are requested, the state machine moves back and forth between the aforementioned states supplying all requested data. When all requested data are supplied, the state machine moves back to the Idle State (S0D). Upon detection of a signal from the LBASM indicating a Control Space access, the state machine moves to the Exp Space Rd/Wr Dec state (S11D). There it moves to the Exp Space Read state (S12D) if a read is indicated. If the Read is to an area other than the RX Window RAM, the state machine moves to the Wr Exp Data to LB state (S14D), where the data are received to be returned to the PCI Interface chip 10. The state machine then returns to the Idle state (S0D). If the Read is to the RX Window RAM area, then the state machine moves to the RX WRAM Read 1 state (S18D) where it writes the address to the mailbox register. It waits until the argument is taken by the serial section at which time it moves to the RX WRAM Read 2 state (S17D) where it waits for the data from the RX WRAM 23 is loaded into the mailbox register. When the data are returned, the state machine moves to the WR Exp Data to LB state (S14D), where the data are received to be returned to the PCI Interface chip (10). The state machine then returns to the Idle state (S0D). Upon detection of a signal from the LBASM indicating a Control Space access, the state machine moves to the Exp Space Rd/Wr Dec state (S11D). There it moves to the Exp Space Write state (S10D) if a write is indicated. From this state, if the write is to the RX Window RAM 23, then the address is written into the mailbox and the state machine moves to the RX WRAM Write state (S16D). There it writes the Data argument into the mailbox register, and when it is accepted, the state machine returns to the Idle State (S0D). From the (S10D) state, if the write is to the DMA Command FIFO 14, then the state machine moves to the Wr to DMA FIFO state (S20D) and strobes the data into the FIFO. It then returns to the Idle State (S0D). From the (S10D) state, if the write is to the Loop Poll Register, then the state machine moves to the Loop Poll 1 state (S22D) where it loads the first Address for the Loop Poll. It then moves to the Loop Poll 2 state (S21D) where it loads the second address into the PCI Up FIFO 16. It then moves to the Loop Poll Data state (S19D) where it loads the loop poll data into the PCI Up FIFO. The state machine then returns to IDLE state (S0D).

Figure 11:
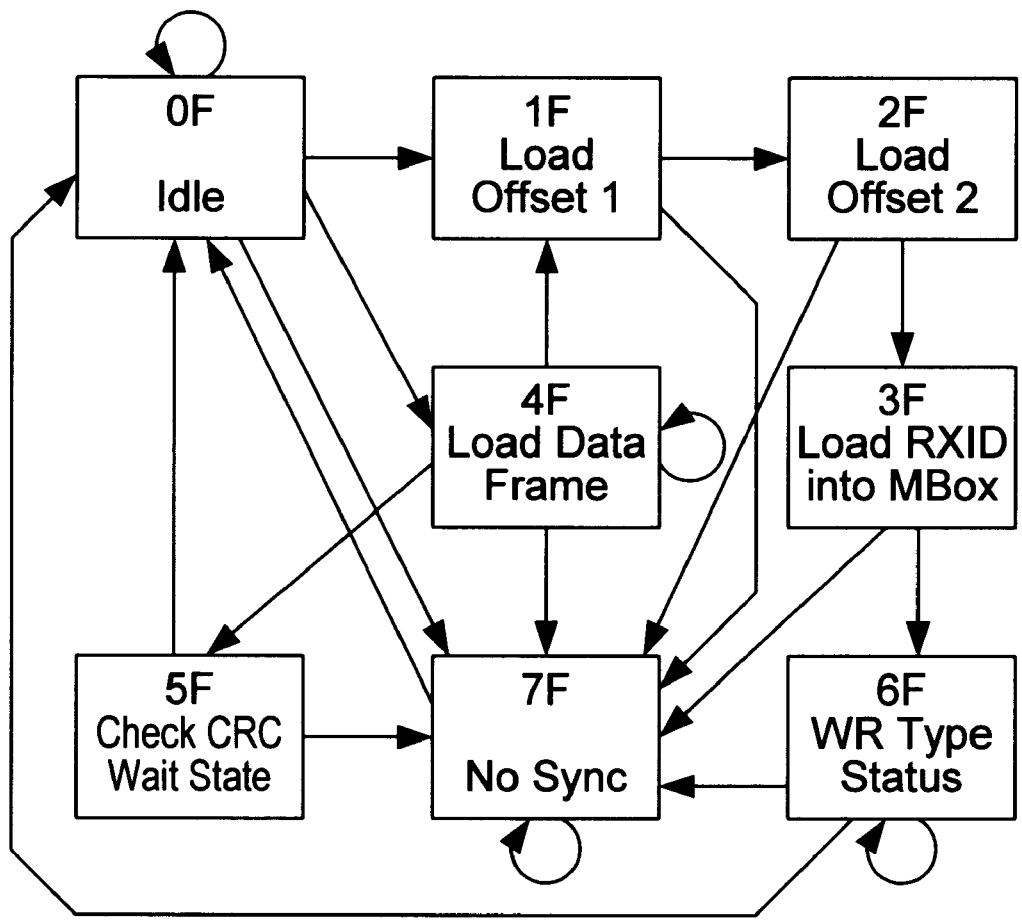
FIG. 11 is a state diagram showing the receiver state machine function of the Receive Control incorporated on the board of FIG. 1.

Receiver State Machine (RSM)—As shown in FIG. 11, upon reset and in between actions, the RSM resides in the Idle state (S0F). Upon detection of a start of frame indicating a configuration transfer, the state machine moves to the Load Offset 1 state (S1F) where it loads the fist offset argument. It then moves to the Load Offset 2 state (S2F) where it loads the second offset argument. It then moves the Load RXID Into Mbox state (S3F) where it loads the RX ID. It finally moves to the Wr Type Status state (S6F) where it stores status from the configuration frame. It then moves back to the Idle state (S0F). Upon detection of a start of frame indicating a data frame, the state machine moves to the Load Data Frame state (S4F) where it sequentially loads all arguments into the RX FIFO. When the last argument is loaded into the RX FIFO, the state machine moves to the Check CRC Wait State (S5F) where the CRC value is checked. It then moves back to the Idle state (S0F). If, at any time, the receiver goes out of sync, the state machine immediately moves to the No Sync State (S7F) where it remains until resynchronization is achieved at which time it moves to the Idle state (S0F).

Figure 12:
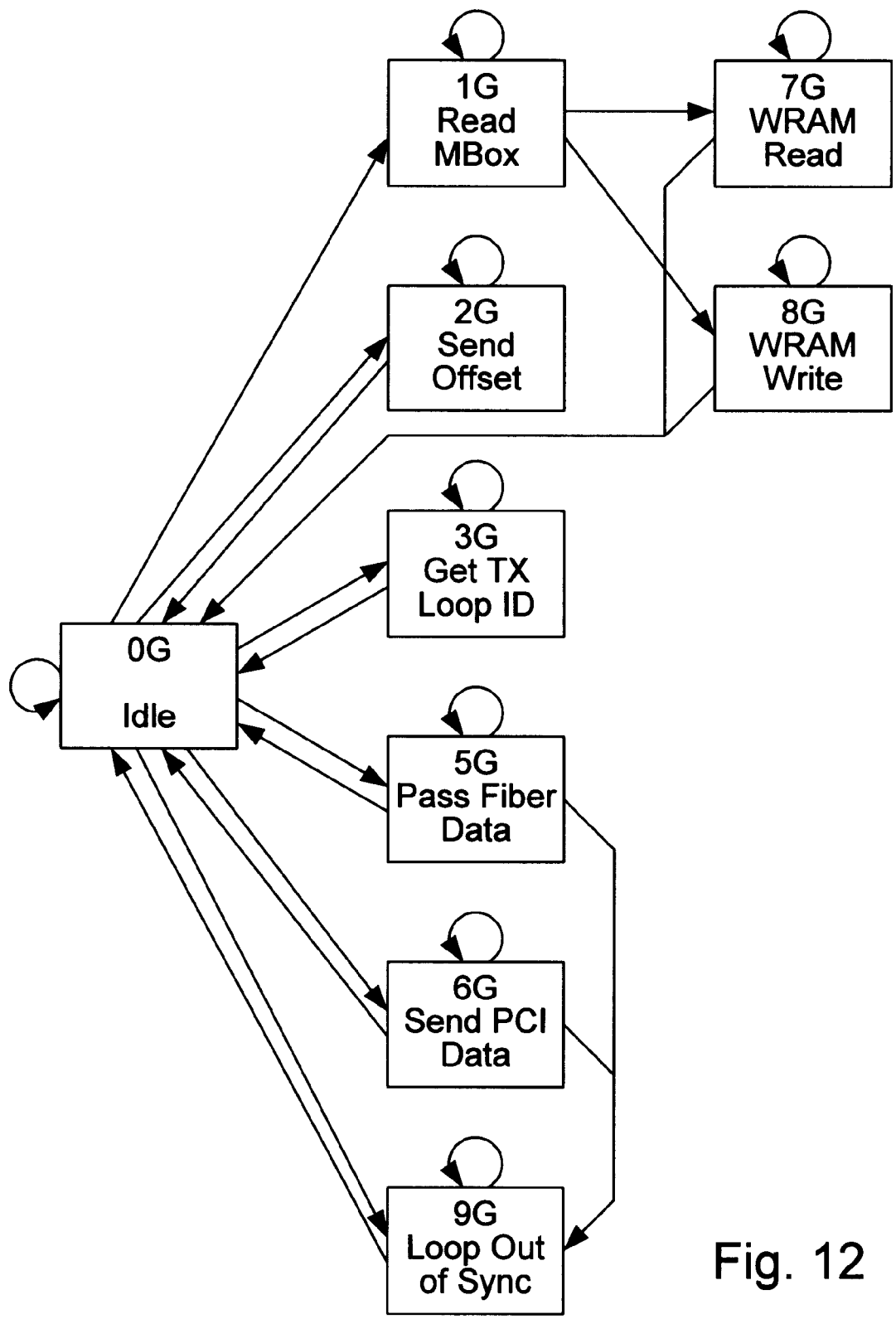
FIG. 12 is a state diagram showing the TX arbitration state machine function of the loop control state machine incorporated on the board of FIG. 1.

TX Arbitration State Machine (TASM)—As shown in FIG. 12, upon reset and in between actions, the TASM resides in the Idle state (S0G). Upon detection of the mailbox signal from the PCI Up FIFO16, the state machine moves to Read Mbox state (S1G). There it determines whether the action is a RX Window RAM read or write while using the mailbox entry to address the RX Window RAM 23. If the action is a RX Window RAM read it moves to the WRAM Read State (S7G) and returns data to the PCI Down FIFO 15 mailbox. If the action is a write, it moves to the WRAM Write State (S8G) and writes the data in the PCI Up FIFO 16 mailbox into the RX Window RAM 23. From both of these states (S7G and S8G) the state machine moves directly back to the idle state (S0G). After the link goes into synchronization, the state machine moves to the Send Offset state (S2G). Here, it controls the unloading of the RX FIFO offsets and Node ID to the down stream node and transmits the information onto the link. After it unloads the last Offset argument, the state machine moves back to the Idle state (S0G). Upon detection of loop initialization, the state machine moves to the Get TX Loop ID state (S3G). It then receives and stores the upstream node ID and returns to the Idle state (S0G). Upon detection of data in the RX-FIFO 25, the state machine moves to the Pass Fiber Data State (S5G) where it shunts the data out of the RX-FIFO 25 to the Transmitter. It stays in this state until all the data in the block has been transmitted at which time it moves back to the Idle state (S0G). Upon detection of a valid message in the PCI Up FIFO 16, the state machine moves to the Send PCI Data state (S6G). Here it unloads all available messages into the transmitter. When the last message is unloaded, it moves back to the Idle state (S0G). If the receiver goes out of sync, the TASM will exit the Idle state (S0G) and move to the Loop Out Of Sync state (S9G) until the receiver regains synchronization.

Figure 10:
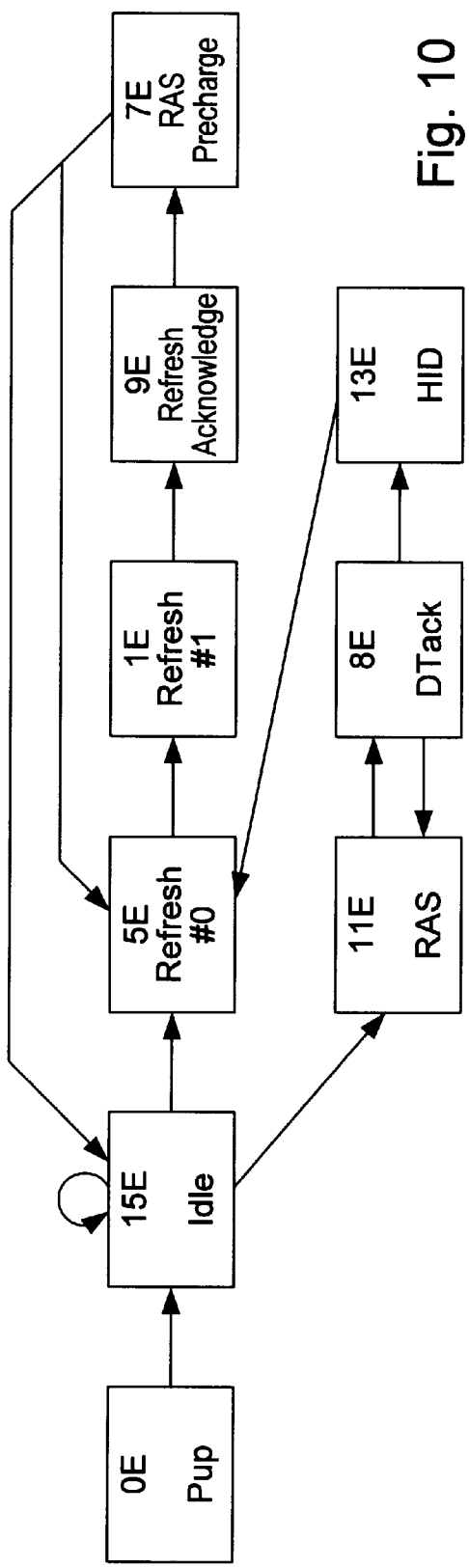
FIG. 10 is a state diagram showing the memory controller state machine function of the DRAM Control incorporated on the board of FIG. 1.

Memory Controller State Machine (MCSM)—As shown in FIG. 10, while in reset the MCSM resides in state PUP (S0E). When the reset is removed the state machine moves, and in between actions, the RASM resides in the idle state (S15E). Upon detection of the signal from the UFSM or DSM, the state machine moves to the RAS state (S11E) where the row address is presented to the array. It next moves to the Dtack state (S8E) where the Column address is presented. From here, the state machine moves back to the RAS state if there are more memory requests available; it moves to the RAS Precharge state (S7E) if there are no memory requests or refresh requests; or it moves to the HID state (S13E) if there is a refresh request, and then to the Refresh #0 state (S5E). The Refresh #0 state (S5E) can also be entered from the Idle state (S15E), or from the RAS Precharge state (S7E) if there is a refresh request active. From there, the state machine moves to the Refresh #1 state (S1E), and then the Refresh Acknowledge state (S9E) before finally moving to the RAS Precharge state (S7E) and back to the Idle state (S15E).

Operational Description

The PCI-Fiber Channel Memory Channel (PCI-FCMC), board 500 (FIG. 5), connects the standard 33 MHz PCI system bus 50 to the Serial Memory Channel, loop 509. As noted, the PCI-FCMC board 500 is a standard Type-5 form factor PCI card that occupies a single PCI slot in a standard type PC-style motherboard. The PCI-FCMC board 500 provides the ability to reflect memory areas from within the on board memory area, from external to the boards memory area, along with the ability to provide a unique arbitration methodology. Some unique features of this board are a loop polling command, a DMA command queue, the ability to provide a dynamic insertion and removal of boards within an operating loop in the copper or fiber based buses without restarting the entire system, the ability to use DMA for memory areas reflected between two or more nodes, and the ability to stimulate 'Mailbox style' interrupts through the reflecting memory serial loop 509. The PCI-FCMC board 500 acts in the system like a standard memory card. Different areas of the Memory array provide different functions which provide the unique variety of features provided by this invention and design. The memory is up to 128 MByte within the board and provides logical shared memory between systems (nodes); this area while it is mapped physically within the 128 Mbyte, can provide a function called 'Spin Lock Allocation Procedure' (SLAP) if a map configuration bit is set. Additionally, the board 500 has the ability to provide DMA driven reflected memory from any portion of the remaining addressable area of memory within the system node.

In the PCI interface section of board 500, PCI interface chip 10 from PLX Technology Inc. Model number PCI9060 provides all communication between the board and the PCI Bus 50. This chip provides the mapping for the 128 Mbyte memory area on board. Additionally, it provides the DMA engine for the block moves of data from system memory into the board, along with moving data received from the link 509 to the off board memory, whenever receive data are outside the internal addressing range. The PCI interface chip 10 is initialized upon power-up with a series of default parameters from a dedicated configuration EPROM 11 through dedicated bus 52. These data provide initial default values to all registers along with providing unique individual data for each board 500. The communication path for board 500 to the rest of the board is through the LAD bus 51. Status information is presented to the Local Bus State Machine (LBSM)13 and control information is provided from the LBSM 13 to both the PLX chip 10, DMA Command FIFO 14, and Local Bus FPGA 100. The LBSM 13 provides all data path control to the Local Bus FPGA 100 along with providing all the loading control for the DMA Command FIFO 14 as well as providing the automatic loading of the DMA registers within the PCI Interface chip 10 from the DMA Command FIFO 14. During the programming of the DMA Command FIFO 14, the LBSM 13 routes the PCI writes to the input of the DMA Command FIFO 14. The data come from the LAD bus 51 into the Local Bus FPGA 100 on the data path 165 into CREG 118. They are then routed through BMUX 105 into EREG 104 which drives the data out of the Local Bus FPGA 100. The LBSM then drives the write signals to the DMA Command FIFO 14. DMA command frames must be loaded in sequence. If this is not done, a DMA sequence error is reported in the status register and the FIFO is reset. When the LBSM 13 determines that the DMA resources are available and the DMA Command FIFO contains a valid command set, it initiates a DMA Load/Start process. The LBSM 13 enables the first value from the DMA command. The data are driven onto the AD_FIFO_PIN bus 64 and into the Local Bus FPGA 100 on an internal bus 150. Part of the data are captured into the DMA type register 103. The lower 11 bits of the remaining data are captured in DREG 102 and routed through AMUX 115 into FREG 116. They are then driven out of the Local Bus FPGA 100 onto the LAD bus 51 back into the PCI interface chip 10. The LBSM 13 drives the register addressing information to the PCI Interface chip 10 along with the write strobe signals, writing the data into the byte count register. The next two arguments from the DMA Command FIFO 14, the source address and destination address, are written in their entirety to the appropriate register in the PCI interface chip 10. The fourth and final argument in the DMA initialization sequence writes a 16 bit argument for the upper address bits (39–32) and point-to-point address information for the serial packet into the internal register 106 in the Local Bus FPGA 100. After this operation, the LBSM 13 writes to the PCI interface chip 10 to initiate the DMA operation. The registers within the PCI interface chip 10 provide PCI bus memory offset and magnitude. Internally, the external address is translated to a base address of 00000000h.

When a memory access is initiated on the PCI bus 50, the PCI interface chip 10 calculates whether the address falls within the range as defined by the configuration registers. Memory writes that are mapped into local memory from the PCI Bus 50 are moved from the PCI bridge 10 onto the LAD bus 51. The Address is captured first in the CREG 118 and routed through the CMUX 110 to the Greg 111. They are next routed out on the DPOST_PIN bus 58 to the DRAM control pal 18. The DRAM control pal formats the address and creates the Row and Column address strobes. The multiplexed address signals are driven out of the DRAM control pal 18 on the HDRAMADD bus 61 to the address buffer 19, and then out the HSIMADD bus 62 to the DRAM 21. The data are driven from the LAD bus 51 to the internal bus 165 in the Local Bus FPGA 100 and captured in the BREG 117. It is then routed through CMUX 110 and captured in Greg 111. Next it is captured by either the even or odd data register 20 after which it is written into the DRAM array 21. Simultaneously, to the aforementioned actions, the address is routed from internal address bus 157 through the BMUX 105 and captured in the EREG 104 in order to be written into the PCI Up FIFO 16. During the data phase, the data are routed though internal data bus 159 and BMUX 105 and captured in EREG 104 via Reg 109 and bus 154. It is then also forwarded into the PCI Up FIFO 16. All these actions are under control of the LBSM 13. Likewise, for memory reads mapped into local memory from the PCI Bus 50, the data are simply moved from the DRAM 21 through the odd or even data bus, 59 or 60, and captured by the data registers 20. From there the data are moved to the DPOST_PIN bus 58 and into the Local Bus FPGA 100. Within the FPGA the data are driven onto the internal RAM data bus 156 and routed through the AMUX 115 and stored in the FREG 116. It is then driven out of the FREG 116 onto the internal LAD bus 165 out onto the LAD bus 51 and back to the PCI bridge 10.

When data are detected in the PCI Down FIFO 15, the LBSM 13 controls the removal and proper dispersal of data. The data can either be within the Local Addressing range or outside of it. When a not empty condition is detected in the PCI Down FIFO 15, the LBSM 13 enables the data onto the AD_FIFO_PIN bus 64. It is then driven into the Local Bus FPGA 100 onto internal bus 150 where it is stored in the AREG 101. The address is decoded to determine whether it is Local or not in the Address Decode logic 107. The LBSM 13 dequeues the next entry in the FIFO 15 and again drives it into the Local Bus FPGA 100 on the internal bus 150 and into the DREG 102. If the decode 107 determines that the address is local, the address bits are driven onto the Down Address bus 152 and the data are driven onto the Down Data bus 153, and they are sequentially routed through the CMUX 110 and stored in the Greg 111. The data are then output onto the DPOST_PIN bus 58, first with the address information out to the DRAM Control Pal 18, then with the Data words into either the odd or even data registers 20. The DRAM Control Pal 18 then controls the writing of the data into the DRAM array 21.

Figure 4:
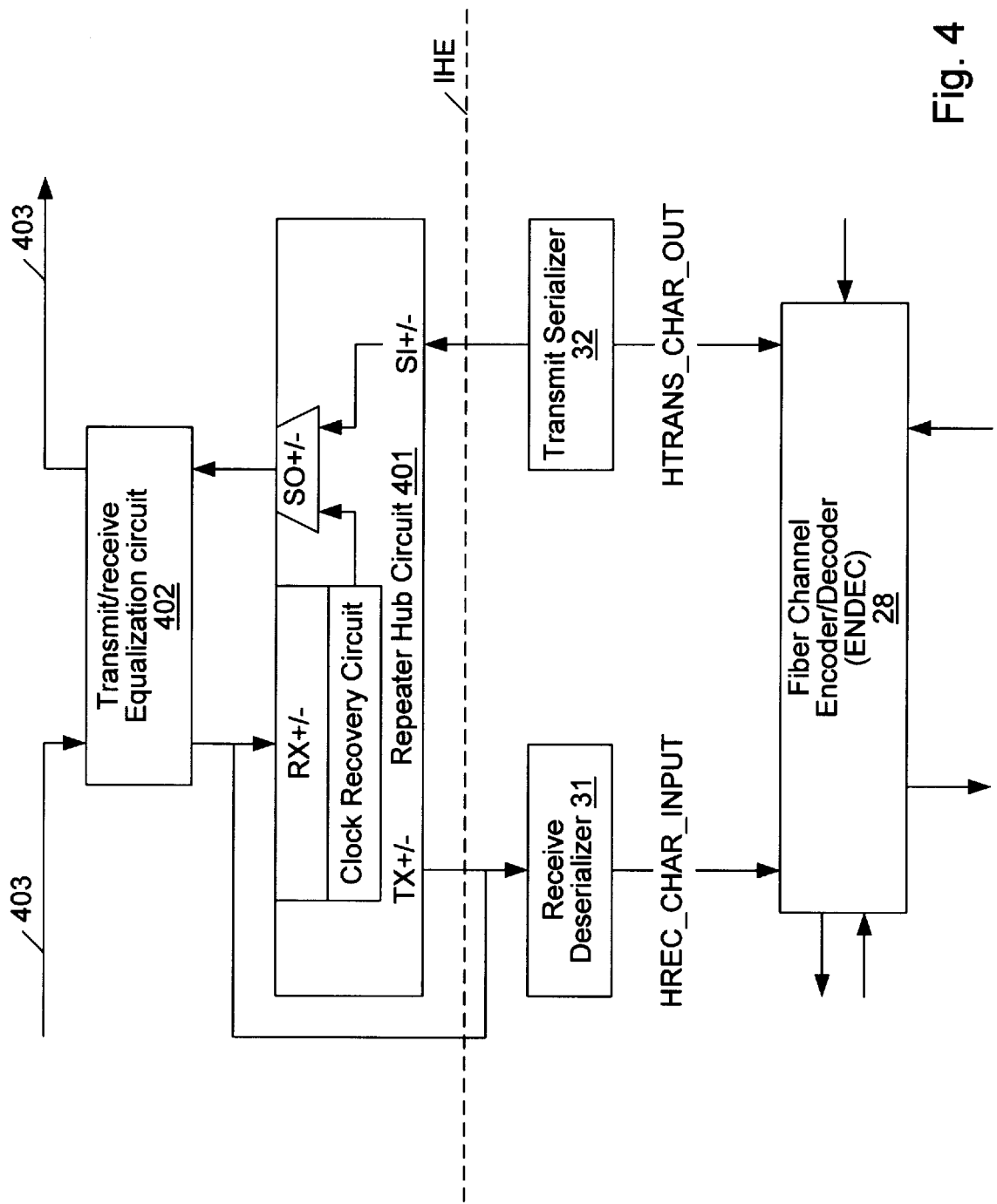
FIG. 4 is a block diagram showing an alternative bus structure using electrical rather than optical elements.

In the serial interface section, the PCI-FCMC uses a standard Fiber Channel chip set 28, 31, 32 to provide high speed interconnect between systems. The Fiber Channel Physical Layers FC-0 and FC-1 (X3.230-1994) are used with a proprietary framing protocol and command and arbitration schemes. It contains a single jumper block. The serial logic consists of a Fiber Channel chip set 28, receive FIFO 25, control CPLDs 27, 26, serializer 32 and a deserializer 31, optionally, a channel equalizer, such as 402 as shown in FIG. 4, or optionally Fiber Optic Transmitter/Receiver 34 as show in FIG. 1. The serial logic has three main functions or modes of operation: pass, insert, and remove data packets. Pass mode represents data moving around the serial loop and to the PCI Bus. Insert mode represents data moving from the PCI Bus to the serial loop. Removal mode represents data which has passed around the ring being removed by the last node which receives it. These three modes are controlled automatically by the loop arbitration logic 26.

PASS/REMOVAL MODES—In pass mode, a serial stream of 8b/10b encoded characters is received by the optical receiver 34. The data are passed on a serial bus 86 to the deserializer 31 which builds a 20 bit word and recovers the clock. These data are then passed to the Encoder/Decoder (ENDEC) 28 on the HREC_CHAR_INPUT bus 83. The ENDEC 28 assembles the 20-bit subwords into full 40-bit wide words that are then decoded into both command and data. The ENDEC 28 transmits the data on the DEC_DATA bus 76 to the RX_FIFO 25. The commands are sent to the DECODE C-PLD 27, converted into type, and written into TYPE FIFO 24. The Loop Control State Machine (LCSM) 26 detects the data in the RX-FIFO 25. The LCSM routes the data through the FC Data Path FPGA 200 buffers 204 through the DMUX 205 and latches it into HREG 206. This decoded 32 bit word is staged through two registers 203,202 to compare the segment address (bits 39–32) in the segment comparator 201. Simultaneously, the information is clocked into and staged through the Register File 213. The remaining portion of the address (bits 31–12) are sent through the EMUX 212 and staged through a register 211. These address bits are driven out the buffer 215 onto the WADDR bus 70 to the Receive Window Rams 23. The output of the Receive Window Rams 23 are driven over the WIND bus 69 back to the FPGA 200, and are received by an input buffer 217 and driven on an internal bus 260 to a register 218. If the Comparator 201 indicates a 'hit', the packet which has been staged through the register file 213 is directed on RFD 261 to the GMUX 219, with bits 12 through 31 of the address substituted from the window RAM 23 into the address to the GMUX 219. The original address is presented to the FMUX 209 simultaneously.

The output of GMUX 219 is routed to the DD bus 263 and staged into the JREG 220 to be driven out by the output buffers 223 to the PCI Down FIFOs 15. The output of FMUX 209 is driven on the END bus 255 and whether the data are clocked into the IREG 208 is dependent upon whether the Node ID compared to the ID comparator 214 was found to be equal to the settings of the Loop ID jumpers 12. If the comparison is NOT equal, the staged data stream from the register file 213 is driven on the RFD bus 261 to the FMUX 209 and via the END bus 255 to the IREG 208 and finally via the PL bus 254 to the output driver 207. From there, the data goes on the EN_DATA bus 275 out to bus 72 into the ENDEC 28 where it is coded to 20 bit 8b/10b characters and then sent to the transmit serializer 32 and then through serial bus 87 out the optical transmitter 34. The LCSM 26 generates the command for a start-of-frame (SOF) to the ENDEC 28. Once the ENDEC 28 has acknowledged, the entire frame is read out of the RX-FIFO 25 into the ENDEC 28 while address/data from the frame are also written into the PCI Down FIFOs 15. At the end of the frame, the LCSM 26 generates an end-of-frame (EOF) command to the ENDEC 28, which causes CRC to be appended and the frame ended with an EOF. If the frame is to be terminated, the entire frame is still read out of the RX-FIFO 25 and written into the PCI Down FIFOs 15, but the ENDEC 28 remains off line and only transmits IDLE characters. The command and data sent to the ENDEC 28 is encoded in the 40-bit words that are output on the HTRANS_CHAR_OUT bus 84 to the transmit serializer 32 in 20-bit words, and sent on the serial bus 87 to the Fiber Optic Transmitter 34.

INSERT MODE—In Insert mode, the LCSM 26 reads the type through an internal bus 68 from the bi-directional TYPE FIFO 17 and determines the length and data type that is to be framed and sent out to the loop. The LCSM 26 generates the command for a Start of Frame (SOF) to the ENDEC 28. Once the ENDEC 28 has acknowledged, the LCSM reads the PCI Up FIFOs 16 building a frame to send to the ENDEC 28. The LCSM 26 continues to send sub-blocks from the PCI Up FIFOs 16 to the ENDEC 28 until the PCI Up FIFOs 16 are empty or the maximum sub-block count has been reached. In either case, the LCSM 26 generates an End of Frame (EOF) command to the ENDEC 28, which causes CRC (Cyclic Redundancy Check) to be appended and the frame end with an EOF. The command and data sent to the ENDEC 28 is encoded in the 40-bit words that are output on the HTRANS_CHAR_OUT bus 84 to the transmit serializer 32 in 20-bit words, and sent on the serial bus 87 to the Fiber Optic Transmitter 34.

SERIAL FRAMES—The PCI-FCMC frame consists of a Start of Frame (SOF) followed by one or more data sub-packets, and terminated with a CRC word and an End of Frame (EOF). Data sub-packets consist of two addresses and one or more data phases. The address phase contains 64 bits of information which is used to control the data flow. Table 1–2 shows the format of the address phase.

TABLE 1-2

Address Phase Sub-packet Description

| Bit | Field | Description |
| --- | --- | --- |
| 63–60 | ByteEna | Single bit codes that define valid bytes in the current data phase. These are high true and are defined as follows: Bit 63 –> byte 3 (bits 31–24) valid Bit 62 –> byte 2 (bits 23–16) valid Bit 61 –> byte 1 (bits 15–8) valid Bit 60 –> byte 0 (bits 7–0) valid |
| 59–52 | Count | The count of 32 bit data words that follow the address phase. PCI-FCMC only supports counts of 16 words or less. |
| 51–44 | Node ID | This field is the node ID or loop address of the node that removes the frame from the loop. |
| 43–41 | Rsvd | |
| 40 | | Point to Point DMA |
| 39–0 | Address | A 32-bit address Specifying the destination of the data (internal RAM or PCI bus) |

As is evident from the above, each sub-packet has a 64-bit address phase. The data path, however, is only 32 bits wide, so in order to transmit out a single address phase it takes two transfers (i.e., the first two transfers in the sub-packet are the 64 bit address phase).

With respect to the 0–39 bit address field containing designating the 32 bit address, the 32 bit address is mapped by the TX Window RAM 22 into a 40 bit address to be transmitted on the FCMC bus loop 509. This is accomplished by merging the original 12 lower bits (0 to 11) with a 28 bit output from the TX Window RAM 22 (into bits 12–39), and it is with this address that the transfer is placed on the bus. When the transfer is received, the top 10 bits of the address received from the FCMC bus loop 509 are compared with 10 bits from the RX Window RAM 23, and if they match then the data are saved again with the lower 12 bits of the address (0–11) being merged with 20 bits from the RX Window RAM 23 in bit positions 12 to 31. This forms the full receive 32-bit address.

Window RAM initialization—The Window RAM regions of the FCMC board 500 are mapped into the PCI memory space at FFEFFFFFH–FFE00000h for RX Window RAM 23 and FFDFFFFFh–FFD80000h for TX Window RAM 22. The process of programming the TX Window RAM 22 involves a write on the PCI bus 50 to the FFE00000h to FFEFFFFFh region. These addresses are recognized by the PLX PCI interface chip 10 and accepted. The address and data are placed on the LAD bus 51 which transmits the data to the Local Bus FPGA 100. Inside the Local Bus FPGA, the address bits are captured by the CREG 118 and driven onto the internal Address bus 157 out to the TX Window RAM 22. The next cycle the data, which are driven from the PLX PCI interface chip 10 through the LAD bus 51 to the Local Bus FPGA 100 are captured into the BREG 117. It is driven onto the internal Data bus 159 along the WRAM Program pathway to the TX Window Ram 22 via data lines 57. The data are then written into the TX Window RAM 22 by strobing their write enable lines. When the contents of the TX Window RAMs 22 are read, the address path is the same as the write. The data are then driven from the TX Window Rams 22 onto the WRAM-PIN bus 57 to the Local Bus FPGA 100. Inside the array, they are driven onto the Data bus 159 along the WRAM READ path to the AMUX 115 and registered into the FREG 116. From the FREG 116, the data are driven on the internal bus 165 out to the LAD bus 51 back to the PCI Interface 10.

The process of programming the RX Window RAM 23 involves a write on the PCI bus 50 to the FD800000h to FD8FFFFFh region. These addresses are recognized by the PCI interface chip 10 and accepted. The address and data are placed on the LAD bus 51 which transmits the data to the Local Bus FPGA 100. Inside the Local Bus FPGA, the data are captured by the CREG 118 and driven onto the internal Address bus 157 to the BMUX 105 and into the EREG 104. It is then driven out of the Local Bus FPGA into the PCI Up FIFO 16, bypass register. The address is removed from the FIFO and written into the KREG-36 hld (222). It is then driven on the UPLOOP bus to the EMUX and into the REG (211) and out through the output buffer (215) to the address lines of the RX Window RAM. After the address argument has been removed from the bypass register, the next cycle, data cycle, begins. The data are driven from the PLX PCI interface chip (10) through the LAD bus (51) to the Local Bus FPGA (100) is captured into the CREG-36 (118) and driven onto the internal Address bus (157) to the BMUX and into the EREG-36. It is then driven out of the Local Bus FPGA into the PCI Up FIFO (16) bypass register. The address is removed from the FIFO and written into the REG-36 hld (222). It is then driven on the UPLOOP bus to the output buffer (216) to the data lines of the RX Window RAM. The data are then written into the RX Window RAM. When the RX Window RAMs (22) are read, the address path is the same as the write. The data are driven from the RX Window RAMs on the WIND bus (69) to the FC Data Path FPGA. Inside the FC Data Path FPGA (200) it is driven through the input buffer (217) on a bus (260) into the REG (218). From the output of the REG (218), it is driven on the WRD bus (257) through the GMUX (219) into the JREG-36 (220). It is driven out of the JREG-36 (220) on a bus (264) to an output buffer (223). It is then written into the bypass register of the PCI Down FIFO (15) from which it is then driven into the DREG (102), through the AMUX 115 into the FREG 116. The data are driven onto the output bus 165 of the Local Bus FPGA 100 out the LAD bus 51 back to the PCI interface 10 returning the data onto the PCI bus 50.

The termination address is handled in one of three ways by the PCI-FCMC board 500. In the case of the normal transfer, the address is programmed with the address of the node just prior to the transmitting node. This address is acquired during the node initialization process where each node transmits its address to its nearest neighbor. In the case of the spin lock procedure, the address is programmed with the address of the transmitting node. Lastly, in the case of the point to point/multipoint protocol, the address is programmed with the address of the node to which the data are destined. In all the cases, the data are transmitted onto the link, and at each node, the address of the packet is compared with that of the Switch setting 12 (node ID) by the comparator 214, and if there is no match, the data are retransmitted out to the next link in the loop. When it finally gets to the node which has an address matching the address broadcast, that node removes the transfer from the loop.

THE POINT-TO-POINT DMA (PTP-DMA) protocol allows for the private passing of messages between two nodes attached to the loop 509. This is important in that this minimizes the traffic traveling around the FCMC ring 509 as it removes the transfer when it arrives at the destination instead of the transfer traversing the entire ring system. The PTP-DMA protocol essentially uses the following structures DMA FIFO 14, the Comp SEG 201, and the Compare Ids 214. The methodology is as follows. The DMA FIFO 14 contains the address of the node to which the data are destined along with the PIP-DMA context tag. This is the address of the node which will ultimately remove the data from the link as described in the UFSM (FIG. 9). The PTP-DMA context bit indicates to the receiver that the data is not to be stored at any intermediate node location. The programming of the DMA FIFO 14 involves the sequential loading of 4 arguments into the FIFO 14 from the PCI bus 10. The PCI Interface chip 10 detects a write to location FFF00000h. It accepts the transfer and places the write onto the LAD bus 51, first the address phase which is strobed into the CREG 118 and then the data phase which is strobed into the BREG 117. The address is decoded by the Address Decoder 119 which indicates that this argument is to be stored in the DMA Command FIFO 14. The data argument travels on the bus 159 to REG 109, and then to the BMUX 105. It then is latched into the EREG 104 and travels out the bus 150 to the AD_FIFO_PIN bus 64 where it is written the DMA Command FIFO 14. This first argument contains The DMA type and Transfer count. The next 3 arguments are loaded by PCI bus 50 writes to locations FFF00004h (32 bits of the Destination Address (lower portion)), FFF00008h (the Source Address), and FFF0000Ch (the upper 8 bits of the 40 bit address which is to be put out on the FCMC bus 509, the Point to Point Destination address and byte enables). The Unloading of the DMA Control FIFO 14 is described in the DPSM section. The first three entries from the DMA Command FIFO 14 are driven onto the AD_FIFO_PIN bus 64 into the Local Bus FPGA 100. Within this array, the data are driven on the 150 bus to the DREG 102. From there it is driven on the data bus 153 into the AMUX 115. Out of the AMUX 115 the data are driven on the bus 1271 into the FREG 116. The FREG 116 drives out the data bus 165 out of the FPGA to the LAD bus 51 to the PCI Interface chip 10. The Local Bus State Machine FPGA 13 drives the register addressing information to the PCI Interface chip 10 and strobes the write to the chip. The fourth entry is driven out of the DMA Command FIFO 14 onto the AD_FIFO_PIN bus 64 into the Local Bus FPGA 100. Within the array the data are driven on the 150 bus to the DMA Uadd register 106 where it is stored until the DMA operation is commenced.

When the DMA operation starts, the PCI Interface chip 10 starts reading the block of data from the PCI bus. The chip presents the address on the LAD bus 51 to the Local Bus FPGA 100, which drives it on its internal bus 165 to the CREG 118. The data are driven on the address bus 157 to the BMUX 105 to the EREG 104. There, the contents of the DMA Uadd 106 register is fist driven out on the AD_FIFO_PIN bus 64 and loaded into the PCI Up FIFO 16. Next the address in the EREG 104 is driven out on the AD_FIFO_PIN bus 64 and loaded into the PCI Up FIFO 16. The DMA operation follows the address cycle with a block read on the PCI bus 50. The PCI Interface chip 10 transfers those data to a series of writes on the LAD bus 51. Each data transferred on the bus is driven onto the internal data bus 165 of the Local Bus FPGA 100, and into the BREG 117. From there it is driven into the REG 109 from the 159 bus and out on to the 154 bus into the BMUX 105. From the BMUX 105 the data are stored in the EREG 104 and then driven out of the EREG 104 on the 150 bus to the AD_FIFO_PIN bus 64 and into the PCI Up FIFO 16. A counter within the Local Bus State Machine 13 counts each data entry and at the end of the transfer drives the transfer count on 63 bus into the Type FIFO 17 in order to transmit the word count to the serial section. The serial section transmits the data as described in the INSERT MODE section. When the packet is received by the next node in line, the packet is first loaded into the RX-FIFO 25. The packet is dequeued from the RX-FIFO 25 and the two address words are staged into the address staging registers 203, then 202 and 212 while the 8 bit nodal address information is sent to the Comp Ids comparator 214 and the PTP-DMA context bit is sent to the Receive Decode C-PLD 27. The output of the final staging registers are used to address the RX Window RAM 23. The data read from the RX Window RAM is driven onto the WIND bus 69 and received back into the FC Data Path FPGA 200 via bus 258. The Receivers (buffers) 217 drive the data on bus 260 to the REG 218 where it is stored. The state of the PIP-DMA context bit is used to decide whether to keep the data. If the decision is to keep the data, bit 19 through 0 from the REG 218 are merged into bit positions 31 through 12 respectively in GMUX 219 and bits 11 through 0 are read from the register file 213 and then bits 31 through 0 are all stored in the JREG 220 in preparation to be sent to the memory. Finally, if the result of the Comp Ids comparator 214 was false, the packet is reloaded out of the register file 213 back to the transmit path on the RFD bus 261 which routes the data through the FMUX 209, the IREG 208, and out the EN_DATA bus 275 to be driven to the next node in the loop. If the result of the Comp Ids comparator 214 is true, the packet is not fed back to the transmitter.

The software protocol is as follows. The software functionality for the point to point protocol, involves the programming of the DMA Command FIFO 14 with the 4 arguments for the initialization of the DMA transfer. This is accomplished by a series of register writes to the PCI-FCMC 500. No other initialization is required.

THE POINT-TO-MULTI-POINT DMA (PTM-DMA) protocol allows for the private passing of messages between multiple nodes attached to the loop 509. This is important in that this minimizes the traffic traveling around the FCMC ring 509 as it removes the transfer when it arrives at the destination instead of the transfer traversing the entire ring system. The PTM-DMA protocol essentially uses the following structures DMA FIFO 14, the Comp SEG 201, and the Compare Ids 214. The methodology is as follows. The DMA FIFO 14 contains the address of the node to which the data are destined without the use of the PTP-DMA context tag. This is the address of the node which will ultimately remove the data from the link as described in the UFSM (FIG. 9). Without the PTP-DMA context bit to indicate to the receiver that the data is not to be stored, the data are stored at all intermediate node locations. All other aspects of the transmission of the PTM-DMA are identical to PTP-DMA described earlier. When the packet is received by the next node in line, the packet is first loaded into the RX-FIFO 25. The packet is dequeued from the RX-FIFO 25 and the two address words are staged into the address staging registers 203, then 202 and 212 while the 8 bit nodal address information is sent to the Comp Ids comparator 214. The output of the final staging registers are used to address the RX Window RAM 23. The data read from the RX Window RAM is driven onto the WIND bus 258 and received back into the FC Data Path FPGA 200. The Receivers (buffers) 217 drive the data on bus 260 to the REG 218 where it is stored. From the REG 218, bits 20 through 29 are driven back to the Comp SEG comparator 201 where the decision is made whether to keep the data. If the decision is to keep the data, bit 19 through 0 from the REG 218 are merged into bit positions 31 through 12 respectively in GMUX 219 and bits 11 through 0 are read from the register file 213 and then bits 31 through 0 are all stored in the JREG 220 in preparation to be sent to the memory. Finally, if the result of the Comp Ids comparator 214 was false, the packet is reloaded out of the register file 213 back to the transmit path on the RFD bus 261 which routes the data through the FMUX 209, the IREG 208, and out the EN_DATA bus 275 to be driven to the next node in the loop. If the result of the Comp Ids comparator 214 is true, the packet is not fed back to the transmitter.

The software protocol is as follows. The software functionality for the point to multi-point protocol, involves the programming of the DMA Command FIFO 14 with the 4 arguments for the initialization of the DMA transfer. This is accomplished by a series of register writes to the PCI-FCMC 500. No other initialization is required.

SPIN LOCK ALLOCATION PROCEDURE (SLAP)— The SLAP is accomplished by a subtle variation on the shared memory procedure. As discussed in the Packet Termination Procedure (Non-SLPA), the loop address used to remove the packet from the link, in the case of the SLAP variant, is that of the node initiating the transfer. The write into memory is suppressed initially and is only written when the transfer travels completely around the loop and is returned to the initiating node. This guarantees, if one reads the location to be written and sees that the data has been written, and if one reads the location dedicated to any other node and that location has not been written (should an other node be writing its dedicated location at ANY point in time, it would necessarily see BOTH the write to its location AND the write to this nodes location), then this node wins the allocation procedure.

The SLAP variant allows for the rapid arbitration for data between independent computers. The coordination of these rapidly shared data, however, involves a unique design problem that is solved by the present invention. In order to control the use of these data, control locations are defined and arbitrated between each of the nodes. In other words, one must know whether a resource can be used by a node, and that information is provided by the contents of designated areas, within the on-board Memory, for which it can be arbitrated in an unambiguous way.

A methodology was created which can insure the reliable arbitration of these shared resources to insure that when several nodes are competing for a resource, only one is granted the resource. This methodology according to the present invention uses a software spin lock along with a hardware protocol to insure the unique granting of the resource to a single node. This Spin Lock Allocation Procedure (SLAP), according to the present invention, is part of Fiber Channel Reflective Memory System (FCRMS) previously described. The PCI-FCMC is a collection of point to point connections which when taken together create a logical loop. Information is passed from one node to the next until it moves completely around the loop. It is in this environment in which the SLAP was created to provide a method whereby two nodes could, upon simultaneous request for a resource, distinguish who was given the resource and who was not.

The way in which this problem is solved according to the present invention is to map a number of unique areas equivalent to the number of nodes. This technique creates a shared memory resource, the size of which is dependent upon the number of nodes involved in the arbitration. Each area is mapped to be written by only one of the arbitrating nodes. This insures that there are no conflicts in usage of each memory area between nodes. Each node is able to read all the memory areas for all the nodes.

The hardware protocol of the SLAP on the PCI-FCMC works as a variant of a normal write transfer in the Memory System. In a normal transfer, when a piece of data is written in to a local memory destined to be shared, those data are first written locally, then placed upon the link, and thus, written into the memory of any other nodes sharing these data. The data are removed from the loop prior to it being returned to the initiating node. In the case of the SLAP variant of the shared memory operation, the area is created with subsections which are assigned uniquely to any node which needs to arbitrate for the shared resource. At the beginning of the arbitration, this area is tested to determine whether the resource is presently in use. If not, a request is generated, but not written into local memory. It is only placed on the loop. The transfer is passed around the ring to each node which in turn, if involved in the arbitration, must write the request value into that node's memory. The transfer lastly arrives back at the originating node (it is not stripped by the prior node, but by the originating node), and is finally written into the memory of the originating node. Another variant of this procedure could be accomplished by initially writing to a "shadow" in memory. The transfer, when it is receive into each of the nodes is offset into a different memory area. This different memory area is then read at this other location looking for the arrival of the data around the loop.

Figure 13:
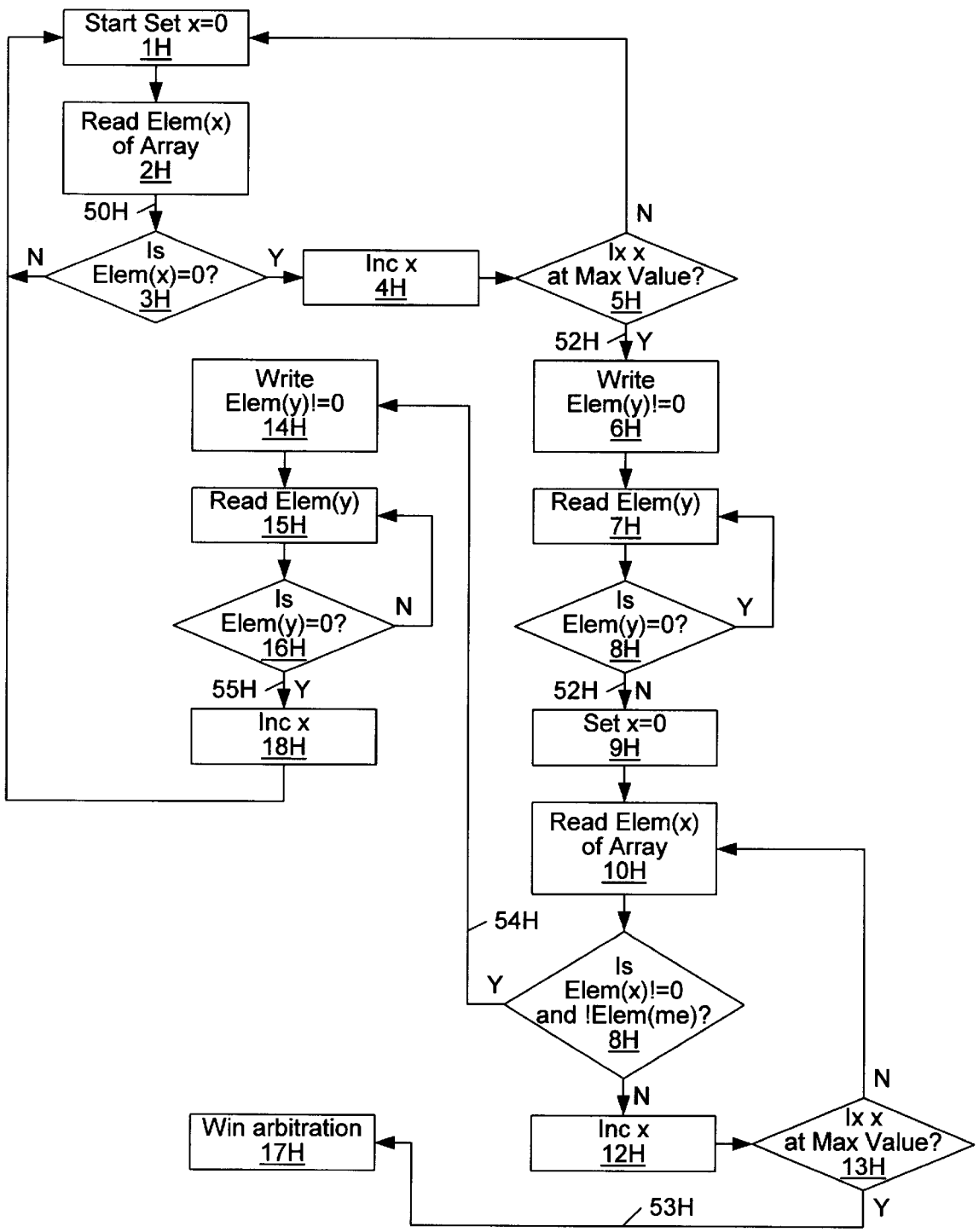
FIG. 13 is a flow diagram showing the operation of the Spin Lock Allocation Procedure.

FIG. 13 represents the flow of the software using of the spin lock feature. The variable 'x' represents the number of nodes participating in the spin lock arbitration. The 'y' variable represents the relative position of this participating node. The first operation is to set the 'x' variable to zero (1H). Each location representing an arbitrating node is read in sequence and checked for active arbitration (2H,3H,4H, and 5H). If there exists an active request, the software exits and rearbitrates (50H). If there are not active requesters, the software moves to begin its own request (51H). The software writes a request to its designated location (6H). It then scans that location until it reads the just written data indicating (7H and 8H) the transfer has gone completely around the loop. Next the 'x' variable is reset to zero (9H). Each location representing an arbitrating node is reread in sequence and checked for active arbitration (10H, 11H, 12H, and 13H). If this requesting node is the only requesting node, the software wins (53H) the arbitration (17H). If other nodes are requesting, the software moves (54H) to clear its request (14H, 15H, and 16H), and then moves (55H) to retry the arbitration after a random wait period (18H) to avoid deadlock.

Shared memory systems previously known allow for the rapid exchange of data between independent computers. The accomplishment of this exchange has been implemented in several ways. When a parallel multidrop bus was used, nodes could be powered-down/removed or powered-up/added without disturbing the network. With the advent of the serial loop implementation, the insertion or extraction of a node now had the effect of disrupting the network. Because of the necessity of providing reliable communication between nodes at all times, the present invention provides ring healing in a new and unique way.

ENCORE ADAPTIVE RING-HEALING (EAR)—A variant in the ring structure allows for the use of a balanced Electrical interface for the ring element rather than the Fiber Optic element in the preceding detailed description of a preferred embodiment. This variation, as illustrated in FIG. 4, substitutes Electrical Driving and Receiving elements for the Fiber optic elements. An important characteristic of this design is the 'Isolated healing element' (IHE, 403). This element allows for the removal and insertion of a node while the ring is up and functioning. Variants of this design would provide dual redundant power to the IHE 403, or allow that the IHE 403 be a stand alone plug-able element to which the node is attached for the ring element rather than the Fiber Optic element in the preceding example.

The methodology according to the present invention provides an adaptive ring-healing (EAR) which utilizes a hardware switch controlled by a 'power good' indication, and a protocol initiating a complete ring resynchronization upon detection of the link event. The problem involves providing an solution for the case where nodes, potentially at their extreme separation from each other, fail. If the solution were simply to multiplex the data through the node, then the resultant ring repair would provide an unreliable connection. This would limit the length of the node to node runs to a sub-multiple of the maximum length of the run, with the divisor being the maximum number of failing nodes. This limitation would obviously severely limit the useful length of the link. It was thus necessary to come up with a technique which would allow the use of maximum length point to point connections.

The structure of the EAR involves the use of a multiplexing device in the data path between the output of the serializing/deserializing devices and the driver/equalizer. The device provides a direct path from the output serializing device and the output driver/equalizer. It also has a tap from the output of the receiver/equalizer. This tap is fed into the second port of the multiplexor. This multiplexor is unique in that it provides a resynchronization on the second port of the multiplexing device. The solution afforded by the present invention is unique in that the resynchronization port is employed as a technique to synchronize an asynchronous device to the synchronous bus. In the case of the present invention, each point to point connection is treated as an asynchronous connection and the device is run synchronously with the source of the signal. In this way, the part, when in bypass mode, acts as a resyncing repeater, and thus, allows for no reduction of internodal distance.

The hardware protocol involves the sensing of the existence of good power to the interface. If the power good indication goes away, a signal is sent to the interface causing a switch of the interface from participating mode to bypass mode. This switch causes a perturbation on the link causing a 'loss of sync' from the receiving chipset.

Software Protocol involves the sensing of the 'loss of sync' signal from the chipset. When this condition is detected, the node transmits out a message to 'take down the link'. When all the nodes on the link are brought down, the link resync/recovery procedure begins. The link resync/recovery procedures needs to handle two distinct uses of "global memory". The first involves using the memory for global shared resources, and the second is for communication.

Global shared resources are always protected with a spin lock. If a loss of sync is detected the "owner" of the shared resource is responsible for refreshing everyone on the ring. If no one owns the spin lock at the time of the failure, then the resource is up to date on all the nodes and refresh is unnecessary. Because of the algorithm used for attaining a spin lock, it is impossible to become the owner of a shared resource while a "loss of sync" condition exists.

Communication between nodes always involves a request, followed by a response that the request is complete. Should a "loss of sync" condition be detected before the final response is received, all requests are retransmitted when the error state is remedied. Because of the serial nature of the ring it is inherent that when a response packet is received, all data for the request has also been received.

LOOP POLLING—The operation of Loop Pooling involves writing to a region which starts the Loop Poll Command (LPC). Upon receipt of this command the serial hardware initiates a special frame that contains his Node ID. This frame is sent around the loop where each node appends his own Node ID and Type as an additional 32-bit word. Each node will insert his 8-bit node ID into bits 19–12 of a 32-bit word and the Type will be inserted into bits 7–0. All remaining bits in each nodes' 32-bit word will be set to zero. When the Frame loops back to the originating node, the entire list is written to the destination address. The Programmer must mask (write all ones) to a buffer of 256 Double-Words in local (CPU) memory or in the local memory of the Originating node to be able to recognize the end of the Loop Node-ID List. When writing to this address, the data phase must contain the destination address of the destination buffer.

MAILBOX INTERRUPT OPERATION—The operation of the Mailbox interrupt is controlled by the initialization of location within the RX Window RAM with the Mailbox context bit. The programming of the RX Window RAM is described earlier. When the packet is received by the node, the packet is first loaded into the RX-FIFO 25. The packet is dequeued from the RX-FIFO 25 and the two address words are staged into the address staging registers 203, then 202 and 212 while the 8 bit nodal address information is sent to the Comp Ids comparator 214. The output of the final staging registers are used to address the RX Window RAM 23. The data read from the RX Window RAM is driven onto the WIND bus 258 and received back into the FC Data Path FPGA 200. One bit of those data is the Mailbox context bit. If this bit is set in the entry addressed by the incoming packet, this context is written into the type FIFO 17. After the data associated with the transfer are removed from the PCI Down FIFO 15 and written into memory, a PCI interrupt command is written into the PCI Interface chip 10, initiating a PCI bus 50 interrupt.

LOOP DATA FLOW OPERATION—After a power up reset or when a node switches loop back modes, the loop toggles from a non-synchronized mode to a synchronized mode. Immediately after loop synchronization, each node transmits an initialization frame to the next node in the loop. This frame contains the source node ID that was stored in the transmitting node, thus allowing every node to recognize the ID of the node transmitting to it. This loop initialization scheme gives each node the ability to determine when a data frame has completed the loop and is to be terminated, or when it is to be retransmitted to the next node in the loop.

The following is an example of normal loop transfer:
1. Node 2 receives Node 1's loop ID during the Loop initialization procedure
2. Node 2 receives some local writes in its memory space.
3. Node 2 builds a packet with Node 1's loop ID in the address phase 1 of all the sub-frames to be transmitted out to the loop.
4. Once step 2 is completed and Node N begins receiving the frame, Node N compares the source loop node ID from address phase 1 of the incoming frame to its own loop ID. As node 2 inserted Node 1's loop ID, no match occurs and Node N retransmits the frame to the next node in the loop (Node 1).
5. When Node 1 receives the frame a match occurs and Node 1 terminates the loop transfer.

The following is an example of a normal spin lock loop transfer:
1. Node 2 receives some local writes to its memory space defined as spin lock, but suppresses the actual write into its memory.
2. Node 2 builds a packet with its own loop ID in the address phase 1 of the sub-frames of the spin lock transfer. This prevents any node in the loop from terminating the spin lock loop transfer as it circles the loop.
3. Once the loop transfer returns to Node 2, a loop ID match occurs and Node 2 terminates the loop transfer. At that time, the data are written into the local memory.

Although the invention has been shown and described in terms of a preferred embodiment, nevertheless changes and modifications are possible which do not depart from the spirit, scope and teachings of the invention. Such changes and modifications are deemed to fall within the purview of the invention and the appended claims.

What is claimed is:

1. A data processing system comprising:
   (A) a plurality of nodes;
   (B) a serial data bus interconnecting the nodes in a series in a closed loop for passing address and data information among said nodes, wherein each of the nodes is connected to exactly one preceding node and exactly one successive node; and
   (C) at least one of said plurality of nodes including:
   (a) a processor;
   (b) a printed circuit board;
   (c) a memory partitioned into a plurality of sections, a first section for directly sharable memory located on the printed circuit board, and a second section for block sharable memory;
   (d) a local bus connecting said processor, said block sharable memory, and said printed circuit board, for transferring data in parallel from the processor to the directly sharable memory on the printed circuit board, and for transferring data from the block sharable memory to the printed circuit board; and
   (e) the printed circuit board having
   (i) a sensor for sensing data transferred into the said directly sharable memory;
   (ii) a queuing device for queuing sensed data;
   (iii) a serializer for serializing queued data;
   (iv) a transmitter for transmitting serialized data onto said serial bus to the successive processing node;
   (v) a receiver for receiving serialized data from the preceding processing node;
   (vi) a deserializer for deserializing received serialized data into parallel data; and
   (vii) means responsive to sensing of transferred data for controlling proper dispersal of said transferred data.

2. The data processing system according to claim 1, wherein said local bus is a PCI bus.

3. A data processing system comprising:
   (A) a plurality of nodes,
   (B) a serial data bus interconnecting the nodes in series in a closed loop for passing address and data information among said nodes, and
   (C) at least one of said plurality of nodes including:
   (a) a processor;
   (b) a printed circuit board;
   (c) a memory for block sharable memory;
   (d) a local bus connecting said block sharable memory and said printed circuit board, for transferring data from the block sharable memory to the printed circuit board; and
   (e) the printed circuit board having
   (i) a memory moving device for reading data from said block sharable memory;
   (ii) a queuing device for queuing read data;
   (iii) a serializer for serializing queued data;
   (iv) a transmitter for transmitting serialized data onto said serial bus to a next successive processing node;
   (v) a receiver for receiving serialized data from a next preceding processing node; and
   (vi) a deserializer for deserializing received serialized data into parallel data.

4. A data processing system comprising:
   (A) a plurality of nodes,
   (B) a serial data bus interconnecting the nodes in series in a closed loop for passing address and data information among said nodes, and
   (C) at least one of said plurality of nodes including:
   (a) a processor;
   (b) a printed circuit board;
   (c) a memory for block sharable memory;
   (d) a local bus connecting said block sharable memory and said printed circuit board, for transferring data from the block sharable memory to the printed circuit board; and
   (e) the printed circuit board having
   (i) a node ID;
   (ii) a memory moving device for reading block transfer data from said block sharable memory;
   (iii) a tagging device for tagging said block transfer data with a transfer tag and a destination node ID tag;
   (iv) a queuing device for queuing tagged data;
   (v) a serializer for serializing queued data;
   (vi) a transmitter for transmitting serialized data onto said serial bus to a next successive processing node;
   (vii) a receiver for receiving serialized data from a next preceding processing node;
   (viii) a deserializer for deserializing said received serialized data into parallel data;
   (ix) a first sensor for detecting the transfer tag;
   (x) a second sensor for sensing the destination node ID tag within the parallel data;
   (xi) a comparator for comparing a sensed destination node ID tag with the node ID;
   (xii) a routing device for transferring said parallel data to said transmitter if said first sensor indicates presence of said sensed transfer tag, and said comparator is not true; and (xiii) a second routing device for transferring parallel data to said memory if said first sensor indicates the presence of said sensed transfer tag and said comparator is true.

5. A data processing system comprising:

(A) a plurality of nodes, (B) a serial data bus interconnecting the nodes in series in a closed loop for passing address and data information among said nodes, and (C) at least one of said plurality of nodes including:
   (a) a processor;
   (b) a printed circuit board;
   (c) a memory for block sharable memory;
   (d) a local bus connecting said block sharable memory and said printed circuit board, for transferring data from the block sharable memory to the printed circuit board; and
   (e) the printed circuit board having
      (i) a node ID;
      (ii) a memory moving device for reading block transfer data from said block sharable memory;
      (iii) a tagging device for tagging said block transfer data with a destination node ID tag;
      (iv) a queuing device for queuing tagged data;
      (v) a serializer for serializing queued data;
      (vi) a transmitter for transmitting serialized data onto said serial bus to a next successive processing node;
      (vii) a receiver for receiving serialized data from a next preceding processing node;
      (viii) a deserializer for deserializing said received serialized data into parallel data;
      (ix) a sensor for sensing the destination node ID tag within the parallel data;
      (x) a comparator for comparing a sensed destination node ID tag with the node ID;
      (xi) a routing device for transferring said parallel data to said transmitter if said comparator is not true; and
      (xii) a second routing device for transferring parallel data to said memory if said comparator is true.

6. A data processing system comprising:

(A) a plurality of nodes;

(B) a serial data bus interconnecting the nodes in series in a closed loop for passing address and data information among said nodes; and (C) at least one of said plurality of nodes including:
   (a) a processor;
   (b) a printed circuit board;
   (c) a memory for block sharable memory;
   (d) a local bus connecting said processor, said block sharable memory, and said printed circuit board, for transferring data from the processor to said printed circuit board and for transferring data from the block sharable memory to the printed circuit board;
   (e) wherein the printed circuit board has
      (i) a memory moving device for reading data from said block sharable memory;
      (ii) a command queuing device for storing memory move command blocks from said processor;
      (iii) a memory move controller including
         (1) a sensor to determine availability of said memory moving device;
         (2) a memory move command loader for unloading commands from said command queuing device and loading said commands into said memory moving device,
      (iv) a queuing device for queuing read data,
      (v) a serializer for serializing queued data, and
      (vi) a transmitter for transmitting serialized data onto said serial bus to a next successive processing node.

7. A data processing system comprising:

(A) a plurality of nodes, (B) a serial data bus interconnecting the nodes in series in a closed loop for passing address and data information among said nodes, and (C) at least one of said plurality of nodes including:
   (a) a processor,
   (b) a printed circuit board,
   (c) a sharable memory,
   (d) a local bus connecting the memory to the processor for transferring data between said processor and said sharable memory, and
   (e) the printed circuit board having
      (i) a mapping device for assignment of a mailbox tag to specific address areas,
      (ii) a receiver for receiving serialized data from a next preceding processing node,
      (iii) a deserializer for deserializing received serialized data into parallel data,
      (iv) a decoder for decoding the address from deserialized parallel data of said mapping device,
      (v) a sensor for detecting a decoded mailbox tag, and
      (vi) an interrupting device for interrupting said processor upon sensing Of said mailbox tag.

8. A method for transferring data between shared memories of two data processing nodes which are not necessarily successive, over a serial bus interconnecting a plurality of said nodes in series in a closed loop, comprising:

(A) providing each node with a distinct node ID:

(B) reading data from a first sharable memory of a node having a node ID;

(C) tagging read data with a transfer tag and destination node ID tag, (D) queuing tagged data, (E) serializing queued data, (F) transmitting serialized data onto a serial bus to a next successive processing node, (G) receiving serialized data from a next preceding processing node, (H) deserializing received serialized data into parallel data, (I) detecting said transfer tag, (J) sensing the destination node ID tag within the parallel data, (K) comparing said sensed destination node ID tag with the node ID for the particular node, (L) transferring said parallel data to said transmitter in response to detection of said transfer tag when comparison between the destination tag and the node ID is not true; and (M) transferring parallel data to said memory in response to detection of said transfer tag when the comparison between the destination tag and the node ID is true.

9. A method for transferring a plurality of blocks of data between shared memories of two data processing nodes which are not necessarily successive, over a serial bus interconnecting a plurality of nodes in series in a closed loop, via a memory moving device for moving each said block of data, which device is initialized and initiated by a queue of command information stored by a processor, comprising:

(A) storing command information into a queue in a processor, (B) determining availability of the memory moving device, (C) unloading command information from said queue in response to availability of the memory moving device, (D) loading said command information into said memory moving device, (E) initiating said memory moving device resulting in the reading of data from a first shared memory, (F) tagging read data with a transfer tag and destination node ID tag, (G) queuing tagged data, (H) serializing queued data, (I) transmitting serialized data onto a serial bus to a next successive processing node, (J) receiving serialized data from a next preceding processing node, (K) deserializing received serialized data into parallel data, (L) detecting said transfer tag within the parallel data, (M) sensing a destination tag within the parallel data, (N) comparing a sensed destination node ID tag with the node ID, (O) transferring said parallel data to said transmitter in response to detection of said transfer tag when the comparison between the destination tag and the node ID is not true, and (P) transferring said parallel data to said memory in a response to detection of said transfer tag when the comparison between the destination node ID tag and the node ID is true.

10. A printed circuit board for use in a data processing system comprising a plurality of nodes which are interconnected in series in a closed loop by a serial data bus, wherein each node includes a processor, a block sharable memory, a local bus connecting the processor and the block sharable memory for transferring data in parallel from the processor to the printed circuit board, and for transferring data from the block sharable memory, said printed circuit board comprising:

(A) a first connector adapted for connecting said printed circuit board to said local bus, (B) a second connector adapted for connecting said printed circuit board to said serial data bus, (C) a directly sharable memory connected to said first connector, for receiving data transferred in parallel from the processor, (D) a sensor for sensing when data are transferred into the said directly sharable memory, (E) a queuing device for queuing sensed transferred data, (F) a serializer for serializing queued data, (G) a transmitter for transmitting serialized data onto said serial bus via said second connector for transmission to a next successive processing node, (H) a receiver for receiving serialized data from said serial bus via the second connector for reception from a next preceding processing node, and (I) a deserializer for deserializing received serialized data into parallel data.

11. A printed circuit board for use in a data processing system comprising a plurality of nodes which are interconnected in series in a closed loop by a serial data bus, wherein each node includes a processor, a block sharable memory, a local bus connecting the processor and the block sharable memory for transferring data in parallel from the processor to the printed circuit board, and for transferring data from the block sharable memory, said printed circuit board comprising:

(A) a first connector adapted for connecting said printed circuit board to said local bus, (B) a second connector adapted for connecting said printed circuit board to said serial data bus, (C) a block sharable memory, (D) a memory moving device for reading data from said block sharable memory, (E) a queuing device for queuing read data, (F) a serializer for serializing queued data, (G) a transmitter for transmitting serialized data onto said serial bus via second connector for transmission to a next successive processing node, (H) a receiver for receiving serialized data from said serial bus via the second connector for reception from a next preceding processing node, and (I) a deserializer for deserializing received serialized data into parallel data.

12. The data processing system according to claim 3 said local bus is a PCI bus.

13. A data processing system comprising:

(A) a plurality of nodes; and (B) a serial data bus interconnecting the nodes in series in a closed loop for passing address and data information among said nodes;

(C) wherein at least one of said plurality of nodes includes
 (a) a processor,
 (b) a printed circuit board, the printed circuit board having
  (i) a queuing device for queuing sensed data,
  (ii) a serializer for serializing queued data,
  (iii) a transmitter for transmitting serialized data onto said serial bus to a next successive processing node,
  (iv) a receiver for receiving serialized data from a next preceding processing node, and
  (v) a deserializer for deserializing received serialized data into parallel data,
 (c) a first memory including a block sharable memory, and
 (d) a local bus connecting said block sharable memory and said printed circuit board for transferring data from the block sharable memory to the printed circuit board (D) a clock recovery circuit for separation of clock and data portions of received serialized data;

(E) a multiplexer selecting a serial bit stream from one of the clock recovery circuit and said serializer;

(F) an error detector for detecting dysfunction of the printed circuit board; and (G) a control circuit for switching of said multiplexer in response to detection of the dysfunction of the printed circuit board.

14. The data processing system of claim 13 wherein said first memory is partitioned into a first section for directly sharable memory on the printed circuit board and a second section for said block sharable memory.

15. The data processing system of claim 13 wherein said local bus connects said processor, said block sharable memory and said printed circuit board for transferring data in parallel from the processor to the directly sharable memory on the printed circuit board and from the block sharable memory to the printed circuit board.

16. The data processing system of claim 13 wherein said printed circuit board further comprises a sensor for sensing data transferred into the said directly sharable memory and means responsive to sensing of transferred data for controlling proper dispersal of said transferred data.

17. The data processing system of claim 13 wherein said printed circuit board further comprises a memory moving device for reading data from said block sharable memory.

18. A data processing system comprising:
(A) a plurality of nodes; and
(B) a serial data bus interconnecting the nodes in series in a closed loop for passing address and data information among said nodes;
(C) wherein at least one of said plurality of nodes includes
    (a) a processor,
    (b) a printed circuit board, the printed circuit board having
        (i) a queuing device for queuing sensed data,
        (ii) a serializer for serializing queued data,
        (iii) a transmitter for transmitting serialized data onto said serial bus to a next successive processing node,
        (iv) a receiver for receiving serialized data from a next preceding processing node, and
        (v) a deserializer for deserializing received serialized data into parallel data,
    (c) a first memory including a block sharable memory, and
    (d) a local bus connecting said block sharable memory and said printed circuit board for transferring data from the block sharable memory to the printed circuit board;
(D) a first switch selecting an optical serial bit stream from one of said fiber optic driver and serialized data from said fiber optic based bus from a next preceding node;
(E) a second switch selecting said received serialized data from said fiber optic based bus from next preceding node;
(F) an error detector for detecting a dysfunction of the printed circuit board; and
(G) a control circuit for switching said first and second switch in response to detection of the dysfunction of the printed circuit board.

19. The data processing system of claim 13 wherein said first memory is partitioned into a first section for directly sharable memory on the printed circuit board and a second section for said block sharable memory.

20. The data processing system of claim 13 wherein said local bus connects said processor, said block sharable memory and said printed circuit board for transferring data in parallel from the processor to the directly sharable memory on the printed circuit board and from the block sharable memory to the printed circuit board.

21. The data processing system of claim 13 wherein said printed circuit board further comprises a sensor for sensing data transferred into the said directly sharable memory and means responsive to sensing of transferred data for controlling proper dispersal of said transferred data.

22. The data processing system of claim 13 wherein said printed circuit board further comprises a memory moving device for reading data from said block sharable memory.

* * * * *